US008597524B2

(12) United States Patent
Donnelly

(10) Patent No.: US 8,597,524 B2
(45) Date of Patent: Dec. 3, 2013

(54) ENCLOSED ROTOR-BASED CAVITATIONAL AND CATALYTIC FLOW-THROUGH REACTION CHAMBER

(75) Inventor: Joseph L. Donnelly, Auburn, WA (US)

(73) Assignee: Donnelly Labs LLC, Auburne, WA (US)

( * ) Notice: Subject to any disclaimer, the term of this patent is extended or adjusted under 35 U.S.C. 154(b) by 132 days.

(21) Appl. No.: 13/303,633

(22) Filed: Nov. 23, 2011

(65) Prior Publication Data

US 2012/0124894 A1 May 24, 2012

Related U.S. Application Data

(63) Continuation-in-part of application No. 12/622,024, filed on Nov. 19, 2009, now Pat. No. 8,333,828, which is a continuation-in-part of application No. 12/008,991, filed on Jan. 15, 2008, now Pat. No. 7,780,149, which is a continuation-in-part of application No. 11/183,243, filed on Jul. 15, 2005, now Pat. No. 7,334,781, which is a continuation-in-part of application No. 10/939,893, filed on Sep. 13, 2004, now abandoned.

(51) Int. Cl.
*C02F 9/04* (2006.01)

(52) U.S. Cl.
USPC ................. 210/749; 123/3; 123/306; 261/90; 422/209; 422/211; 422/224

(58) Field of Classification Search
USPC .......... 422/209, 211, 224, 239; 210/749, 752; 123/3, 198 R, 298, 306; 261/27, 28, 261/34.1, 89, 90; 366/305; 44/300
See application file for complete search history.

(56) References Cited

U.S. PATENT DOCUMENTS

| | | | | |
|---|---|---|---|---|
| 3,246,961 | A * | 4/1966 | Karlsson | 422/604 |
| 3,799,125 | A * | 3/1974 | Hutchinson | 123/3 |
| 4,141,957 | A * | 2/1979 | Szabolcs et al. | 422/135 |
| 4,683,062 | A * | 7/1987 | Krovak et al. | 210/617 |
| 4,869,729 | A * | 9/1989 | Schneider et al. | 48/77 |
| 5,437,845 | A * | 8/1995 | Brioni et al. | 422/198 |
| 5,820,836 | A * | 10/1998 | Morlec et al. | 423/210 |
| 6,919,055 | B2 * | 7/2005 | Kondo et al. | 422/209 |
| 7,334,781 | B2 * | 2/2008 | Donnelly | 261/90 |
| 7,780,149 | B2 * | 8/2010 | Donnelly | 261/27 |
| 7,938,385 | B2 * | 5/2011 | Donnelly | 261/26 |
| 8,333,828 | B2 * | 12/2012 | Donnelly | 96/156 |
| 2004/0099226 | A1 * | 5/2004 | Bromberg et al. | 123/3 |
| 2004/0103660 | A1 | 6/2004 | Kawamura | |
| 2006/0035119 | A1 * | 2/2006 | Katikaneni et al. | 429/19 |
| 2006/0055066 | A1 * | 3/2006 | Donnelly | 261/90 |
| 2007/0295314 | A1 | 12/2007 | Dong | |
| 2009/0183695 | A1 | 7/2009 | Donnelly | |
| 2011/0206574 | A1 * | 8/2011 | Donnelly | 422/225 |
| 2011/0253071 | A1 * | 10/2011 | Donnelly | 123/3 |

FOREIGN PATENT DOCUMENTS

| | | | |
|---|---|---|---|
| JP | 53-27725 | * | 3/1978 |
| JP | 10-131814 A | | 5/1998 |

* cited by examiner

*Primary Examiner* — Richard L Chiesa
(74) *Attorney, Agent, or Firm* — Olympic Patent Works PLLC

(57) ABSTRACT

The current application is directed to an enclosed rotor-based cavitational and catalytic flow-through reaction chamber ("ERCCFRC") that can be employed in a variety of thermal, chemical, and fluid-mechanical processes. The ERCCFRC features a reaction chamber that incorporates a spinning rotor, generating fluid-mechanical forces and cavitation in a fluid within the ERCCFRC. The reaction chamber further incorporates one or more heterogeneous catalysts that promote specific chemical reactions.

21 Claims, 33 Drawing Sheets

--Prior Art--

902

B - Fuel Mixer Assembly

B1 - Machined End Cap
B2 - Machined Housing
B3 - Machined Spindle
B4 - R12 Bearing Shielded
B5 - Spider Coupling Hub, ½" bore
B6 - Pump Seal VGS VG-200
B7 - Buna "O" ring (GBC FMI 034 1-B3P)
B8 - Buna "O" ring
B9 - End Cap Self-Locking Attachment Bolts
B10 - EAD DA34FBB-17 Brushless Motor
B11 - Motor to Mixer Attachment ¾" Hex Head Bolts Rotor Parameters

| |
|---|
| Rotor circumference |
| Rotor length |
| Pattern of rotor bore holes |
| Depth of rotor bore holes |
| Radius of rotor bore holes |
| Shape of rotor bore holes |
| Number of rotor bore holes |
| Surface roughness of rotor |
| Composition of rotor |
| Mass of rotor |
| Ratio of sum of rotor-bore-hole surface sections to rotor surface |
| Shape of rotor |

FIG. 11A

Fuel Refining Unit Parameters

| |
|---|
| $d$ = distance from rotor surface to inner surface of rotor housing |
| $v$ = volume of rotor chamber |
| the ratio $\frac{d}{v}$ |
| Number of input ports |
| Pattern of input-port locations |
| Diameter of input ports |
| Shape of input ports |
| Number of exhaust ports |
| Pattern of exhaust-port locations |
| Diameter of exhaust ports |
| Shape of exhaust ports |
| Shape of inner-rotor-housing surface |
| Composition of inner-rotor-housing surface |
| Roughness of inner-rotor-housing surface |

FIG. 11B

System Parameters

| |
|---|
| Volume of reservoir tank A |
| Volume of reservoir tank B |
| Diameters and lengths of hoses/tubes/fluid communications |

FIG. 11C

Operational Characteristics

| |
|---|
| Fuel pressure within rotor chamber |
| Flow rate of fuel through rotor chamber |
| Rotor rotational velocity |
| Pressure in reservoir tank A |
| Pressure in reservoir tank B |
| Degree of vacuum in reservoir tank B |
| Average amount of fuel in each reservoir |
| Flow rate of fuel through reservoir tank B |
| Temperature within rotor chamber |
| Temperature in reservoir tank B |
| Type of fuel |
| Composition of fuel, including contaminants |

FIG. 11D

Metrics

| |
|---|
| Miles/gallon |
| Concentration of CO in engine exhaust |
| Concentration of $NO_X$ in engine exhaust |
| Concentration of $SO_X$ in engine exhaust |
| Concentration of $O_3$ in engine exhaust |

FIG. 11E

ENCLOSED ROTOR-BASED CAVITATIONAL AND CATALYTIC FLOW-THROUGH REACTION CHAMBER

CROSS-REFERENCES TO RELATED APPLICATIONS

This application is a continuation-in-part of application Ser. No. 12/622,024, filed on Nov. 19, 2009, now U.S. Pat. No. 8,333,828, issued on Dec. 18, 2012, which is a continuation-in-part of application Ser. No. 12/008,991, filed on Jan. 15, 2008, now U.S. Pat. No. 7,780,149, issued on Aug. 24, 2010, which is a continuation-in-part of application Ser. No. 11/183,243, filed on Jul. 15, 2005, now U.S. Pat. No. 7,334,781, issued on Feb. 26, 2008, which is a continuation-in-part of application Ser. No. 10/939,893, filed on Sep. 13, 2004, now abandoned.

TECHNICAL FIELD

The present application is related to flow-through chemical reactors.

BACKGROUND

There are myriad different chemical and physical processing methods employed in modern societies for modifying, separating, purifying, mixing, and processing fluids. Many such processes provide enormous economic benefits, but may also involve significant costs and undesirable side effects and inefficiencies. One family of fluid-processing operations is employed in petroleum refining, discussed below. Others include salt-water desalination, water purification, various industrial chemical reactions, separation of desired metallic particulates from slurries produced in mining operations, and many others.

FIG. 1 illustrates current fuel production and distribution. Crude oil is pumped from oil wells and delivered to oil refineries 102 by ships 104 and oil pipelines. The crude oil is refined at oil refineries, primarily by catalytic cracking of large, complex hydrocarbons to produce various lower-molecular-weight hydrocarbons and by fractionation, to produce various different types of fuel, including kerosene, diesel fuel, and gasoline. Each type of fuel is characterized by various parameters, including flash point, volatility, viscosity, octane rating, and chemical composition. In general, the fractionation process selects a molecular-weight range of alkane, alkene, and non-aliphatic crude oil components which results in each fraction having desired fuel characteristics, including desired flash points, volatilities, viscosities, and octane ratings. Gasoline and diesel fuel are then delivered by truck 106 or pipeline to various distribution points, including service stations 108, where the fuel is delivered to motor vehicles.

While the above-described fuel-processing and fuel-delivery system has successfully provided fuel for motorized vehicles for nearly a century, there are certain disadvantages to the system. For example, the refining process is carried out once, at the oil refinery 102, and once the fuel leaves the oil refinery, there is no further possible processing or processing-based quality control. From a thermodynamic standpoint, fuel is a relatively high-energy and low-entropy substance, and is therefore chemically unstable. Fuel is subject to a variety of chemical-degradation processes, including oxidation, polymerization, substitution reactions, many different additional types of reactions between component molecules and between component molecules and contaminates, absorption of solid and liquid contaminants, absorption of gasses, continuous loss of more volatile components by vaporization and release of vaporized fractions, contamination with water, and many other types of processes. The potential for fuel degradation is increased by the relatively large variation in times between refining and use, the ranges of temperature and other environment conditions that the fuel may be exposed to during delivery, storage, distribution, and while contained in the fuel tanks of motorized vehicles, and by many other factors beyond the control of fuel refiners and fuel distributors. It is likely that, in many cases, the fuel actually burned in internal-combustion engines may differ in chemical composition and characteristics from the fuel originally produced at the oil refinery. In one study conducted at the University of Idaho, a 26% drop in fuel-to-energy conversion was observed at 28 days following fuel processing.

A further consideration is that vehicles differ from one another, internal-combustion engines differ from one another, other internal-combustion-engine-powered devices and vehicles, including generators, pumps, furnaces, and other mass-movement and mass-conversion systems generally differ from one another, making it difficult, if not impossible, to economically produce fuels particularly designed and tailored for a particular use. Were it possible to refine a fuel to produce a fuel optimal for any particular use, it is likely that the vehicle, including automobiles, trucks, aircraft, and trains, or other internal-combustion-engine-powered device would exhibit greater fuel efficiency and produce fewer pollutants than when running on standard, mass-produced fuel. Furthermore, the characteristics of any particular vehicle, internal-combustion engine, and/or internal-combustion-engine-powered device may change dramatically over time, as the vehicle, internal-combustion engine, and/or internal-combustion-engine-powered device ages, and may also change dramatically depending on the extent and types of use and conditions under which the is vehicle, internal-combustion engine, and/or internal-combustion-engine-powered device operated.

For these and other reasons, fuel producers and distributors, motorized-vehicle designers and manufacturers, airlines, train company, transportation companies, heating oil users and distributers, fuel-storage providers, the boating industry, those involved with salvaging contaminated or degraded fuel, and, ultimately, direct and indirect consumers of fuel seek new approaches to modifying and restoring fuel following initial refinement of the fuel. In similar fashion, those involved in myriad other fluid-processing operations continue to seek new approaches to carrying out the operations in more cost-effective and efficient manners.

SUMMARY

The current application is directed to an enclosed rotor-based cavitational and catalytic flow-through reaction chamber ("ERCCFRC") that can be employed in a variety of thermal, chemical, and fluid-mechanical processes. The ERCCFRC features a reaction chamber that incorporates a spinning rotor, generating fluid-mechanical forces and cavitation in a fluid within the ERCCFRC. The reaction chamber further incorporates one or more heterogeneous catalysts that promote specific chemical reactions.

BRIEF DESCRIPTION OF THE DRAWINGS

FIGS. 11A-E show tables of parameters that need to be considered at the design and operational stages of on-board fuel refining.

DETAILED DESCRIPTION

The current application is directed to various types of enclosed rotor-based cavitational and catalytic flow-through reaction chambers ("ERCCFRC") that can be employed in a variety of thermal, chemical, and fluid-mechanical processes. ERCCFRCs can be used to clean, refine, specifically modify, and degas hydrocarbon fuels on-board vehicles, within stationary fuel-reprocessing and re-refining stations, within mobile fuel-processing systems, including mobile fuel-delivery systems, fuel-storage systems, fuel-dispensing systems, and in many other situations in which fuel-refinement and/or reprocessing, prior to combustion, leads to better fuel efficiency, less pollutant emission, and other advantages. ERCCFRCs can also be used in a very wide variety of physical and chemical processing operations, from promoting specific chemical reactions, purifying and separating fluid solutions, suspensions, and mixtures, thermal processing, and many other types of operations.

Figure 1:
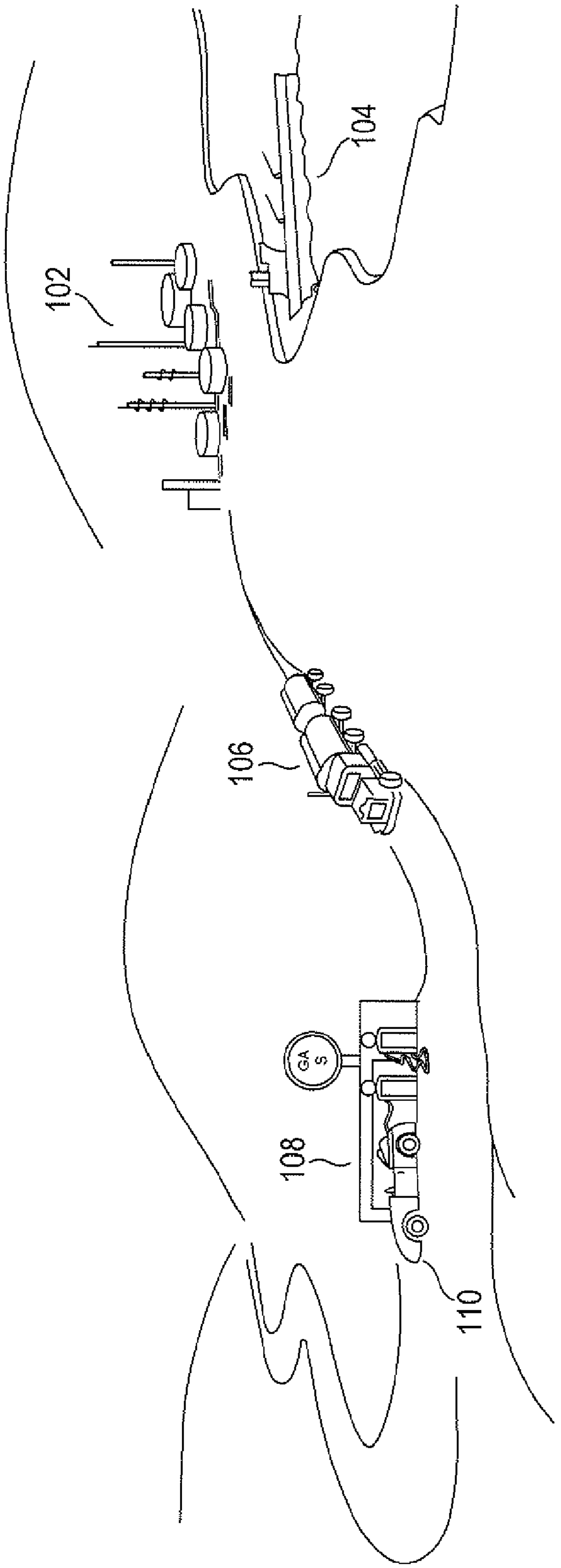
FIG. 1 illustrates current fuel production and distribution.
Figure 2:
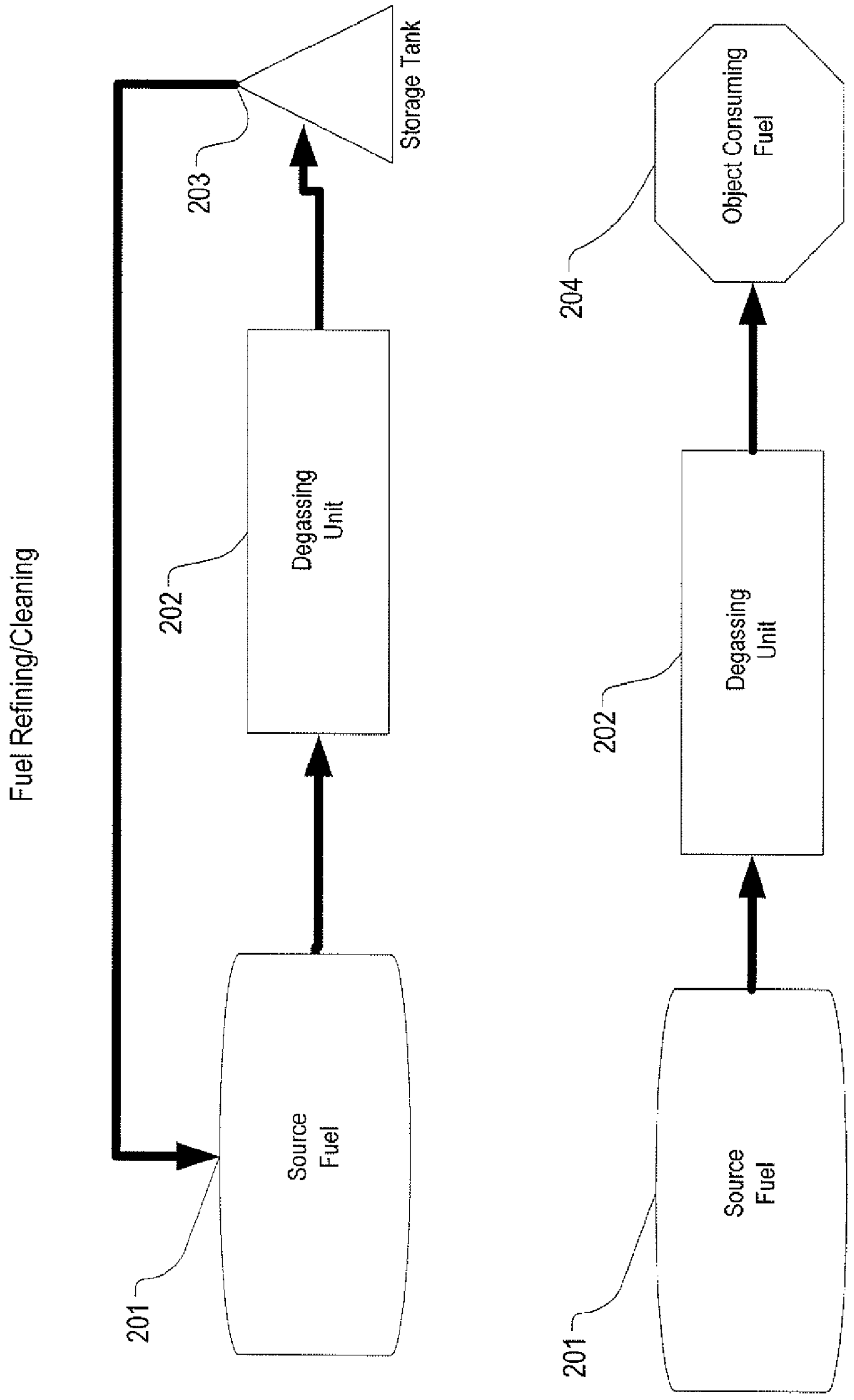
FIG. 2 illustrates on-board fuel refining.

FIG. 2 illustrates on-board fuel refining. As shown in FIG. 2, rather than fuel refining being carried out only once, at the oil refinery (102 in FIG. 1), fuel is reprocessed to clean and degas the fuel so that the fuel performs similarly to the performance that the fuel would have directly following initial refining. When the fuel is pumped from a source 201, the fuel is reprocessed in a degassing unit 202 and then stored in a storage tank 203, from which the fuel is returned to the source after the fuel has been treated. In another approach, the fuel is processed from a source 201 and then returned directly to the source.

Figure 3:
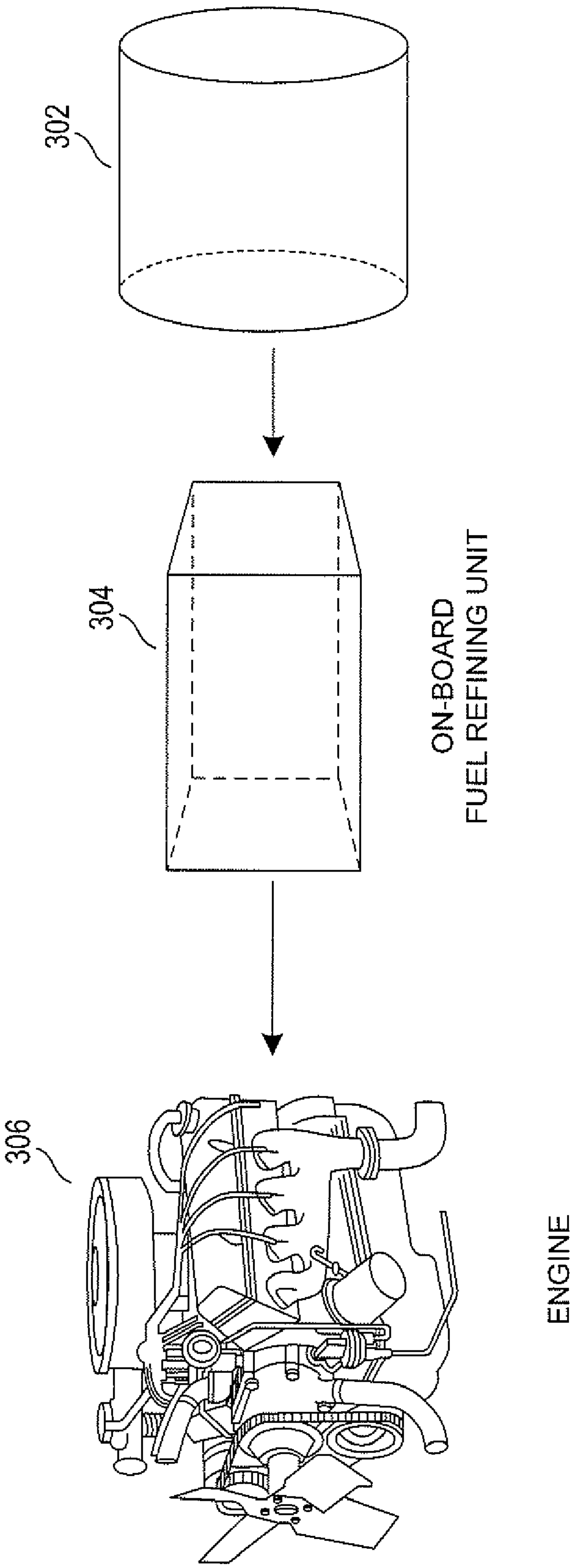
FIG. 3 shows a general approach to on-board fuel refinement.

FIG. 3 shows the general approach of on-board fuel refinement. Fuel is delivered to, and stored within, a fuel tank 302 within a motorized vehicle according to current fuel distribution methods. Fuel is withdrawn from the fuel tank 302 and refined by an on-board fuel-refinement system 304, which stores a certain amount of refined fuel. The engine 306 of the motorized vehicle consumes refined fuel produced by, and stored within, the on-board fuel-refinement system 304.

Figure 4:
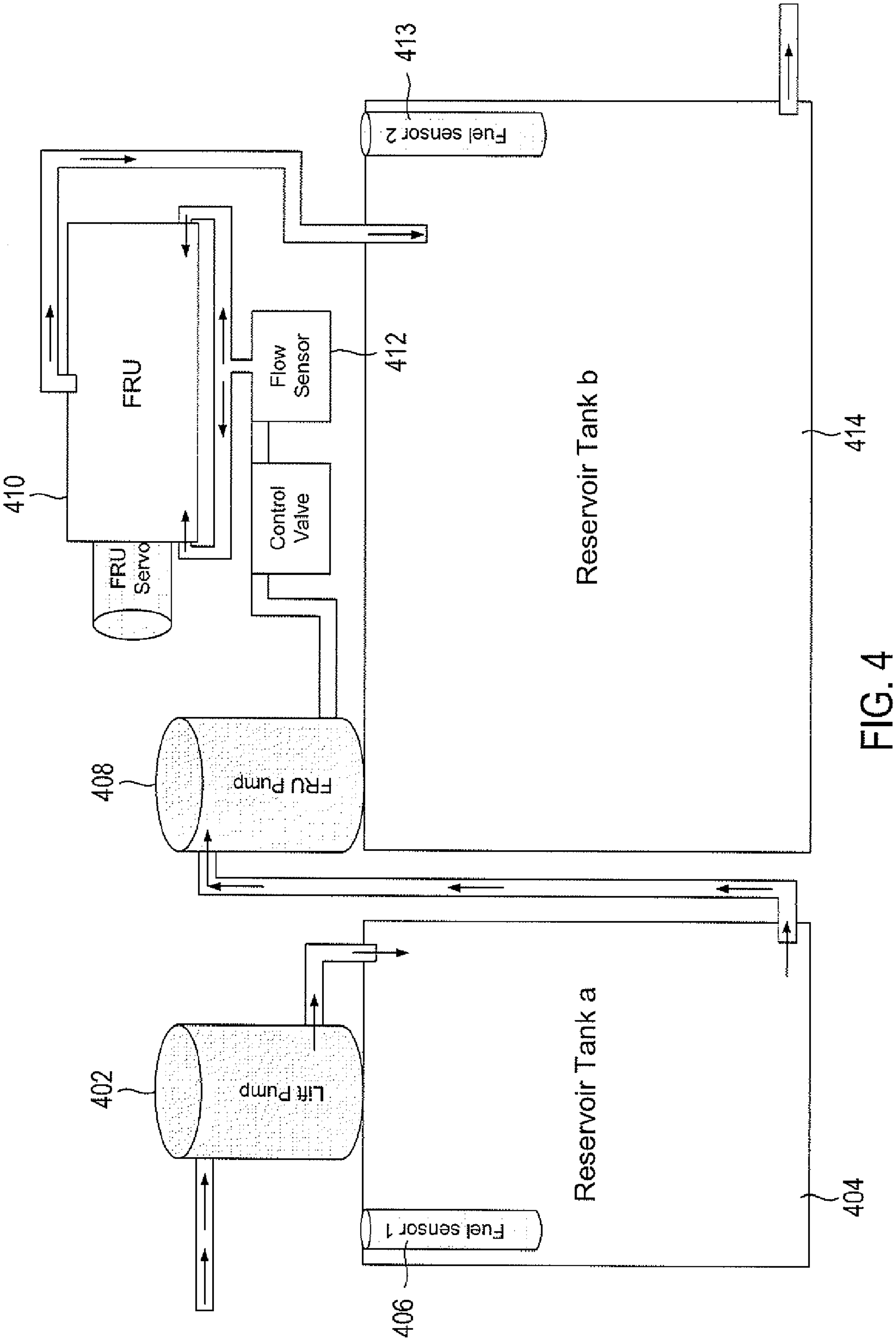
FIG. 4 illustrates an on-board fuel-refinement system.

FIG. 4 illustrates an on-board fuel-refinement system. Fuel is pumped from a vehicle's fuel tank by lift pump 402 and stored in a first reservoir, reservoir tank A 404, under control of a fuel sensor 406 in reservoir tank A that detects fuel levels within reservoir tank A. When the fuel level in reservoir tank A drops below a threshold amount, lift pump 402 is activated to draw additional fuel from the vehicle's fuel tank. The lift pump ensures that, regardless of the current pitch or roll of the vehicle, fuel will be available for on-board refining. Fuel is pumped by a second pump, the fuel-refining-unit pump 408, into the fuel-refining unit 410 under control of a flow sensor 412 and fuel sensor 412, and refined fuel is output to reservoir tank B 414, from which the refined fuel is drawn by the vehicle's fuel pump.

Figure 5:
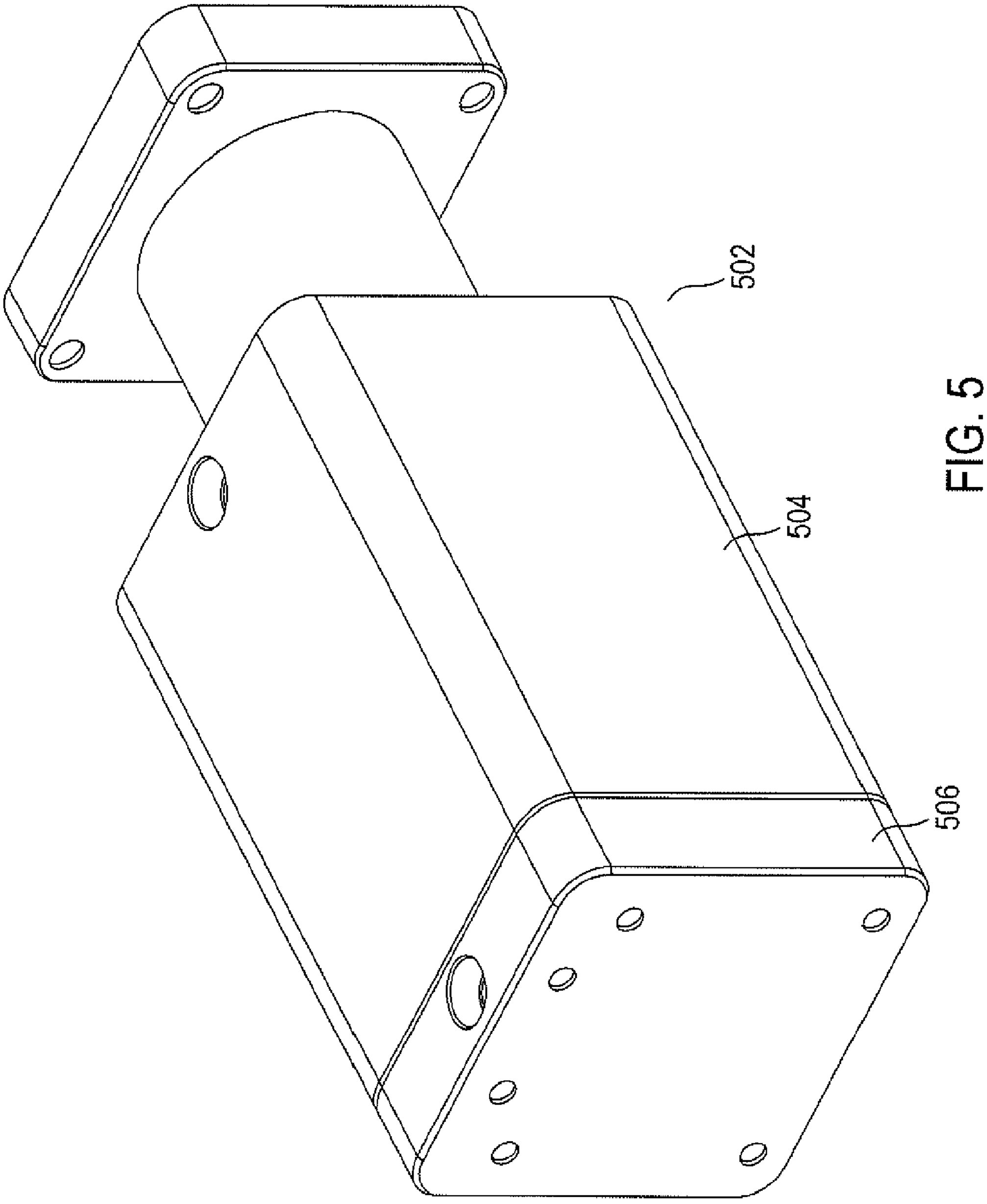
FIG. 5 shows an external view of a fuel-refining unit from two different perspectives.

FIG. 5 shows an external view of a fuel-refining unit. The fuel-refining unit 502 includes a rotor-and-rotor-chamber housing 504, a rotor-housing end cap 506, and a motor mount 508 that mounts the fuel-refining unit to a motor that spins a rotor within the fuel-refining unit in order to apply fluid shear forces to the fuel within the fuel-refining unit and generate cavitation within the fuel.

Figure 6:
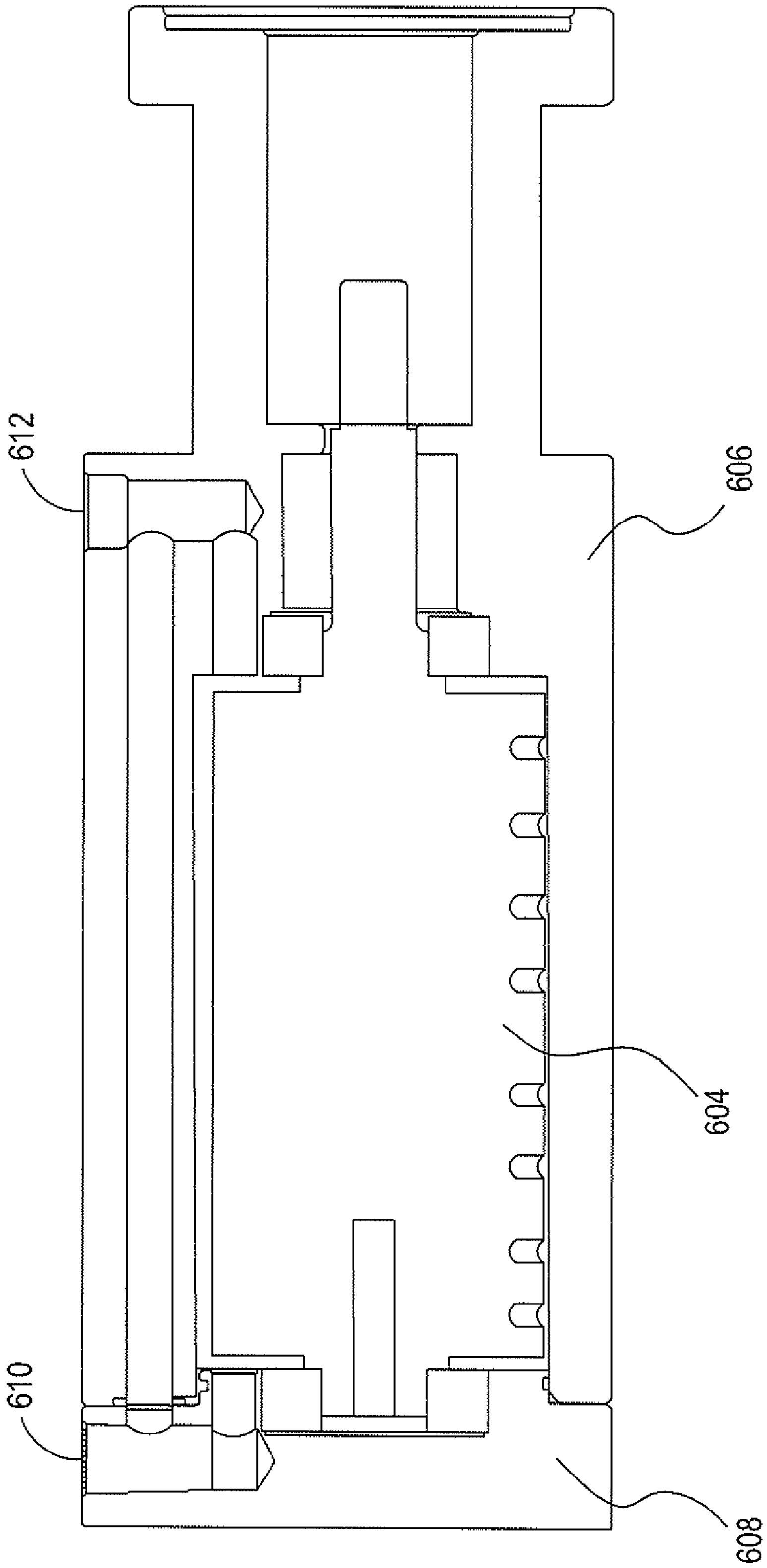
FIG. 6 shows a rotor chamber within a fuel-refining unit.

FIG. 6 shows a rotor chamber within a fuel-refining unit. The rotor chamber 604 is an empty, enclosed and sealed, roughly cylindrical volume formed by the rotor-and-rotor-chamber housing 606 and rotor-housing end cap 608. Two inlet ports 610 and 612 provide channels through which fuel is input, under pressure generated by the fuel-refining-unit pump (408 in FIG. 4), into the rotor chamber.

Figure 7:
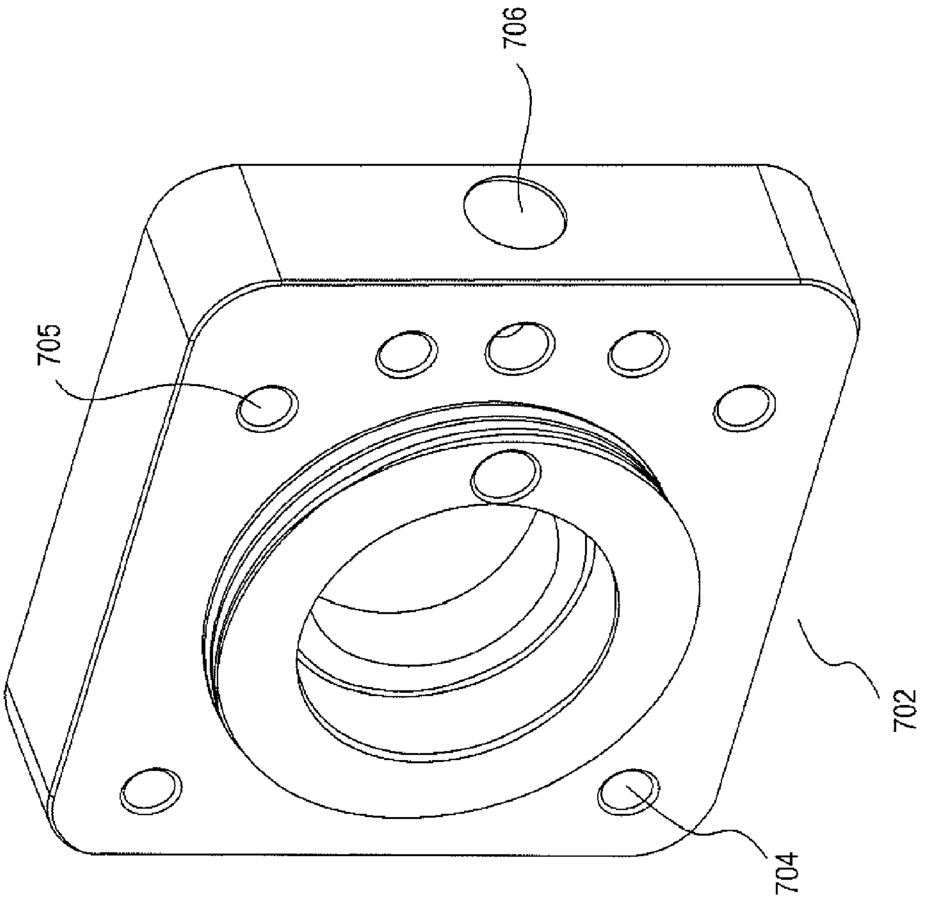
FIG. 7 shows a rotor-housing end cap.

FIG. 7 shows a rotor-housing end cap of a fuel-refining unit. The rotor-housing end cap 702 includes apertures for attachment bolts, including apertures 704-705, and the inlet port 706.

Figure 8A:
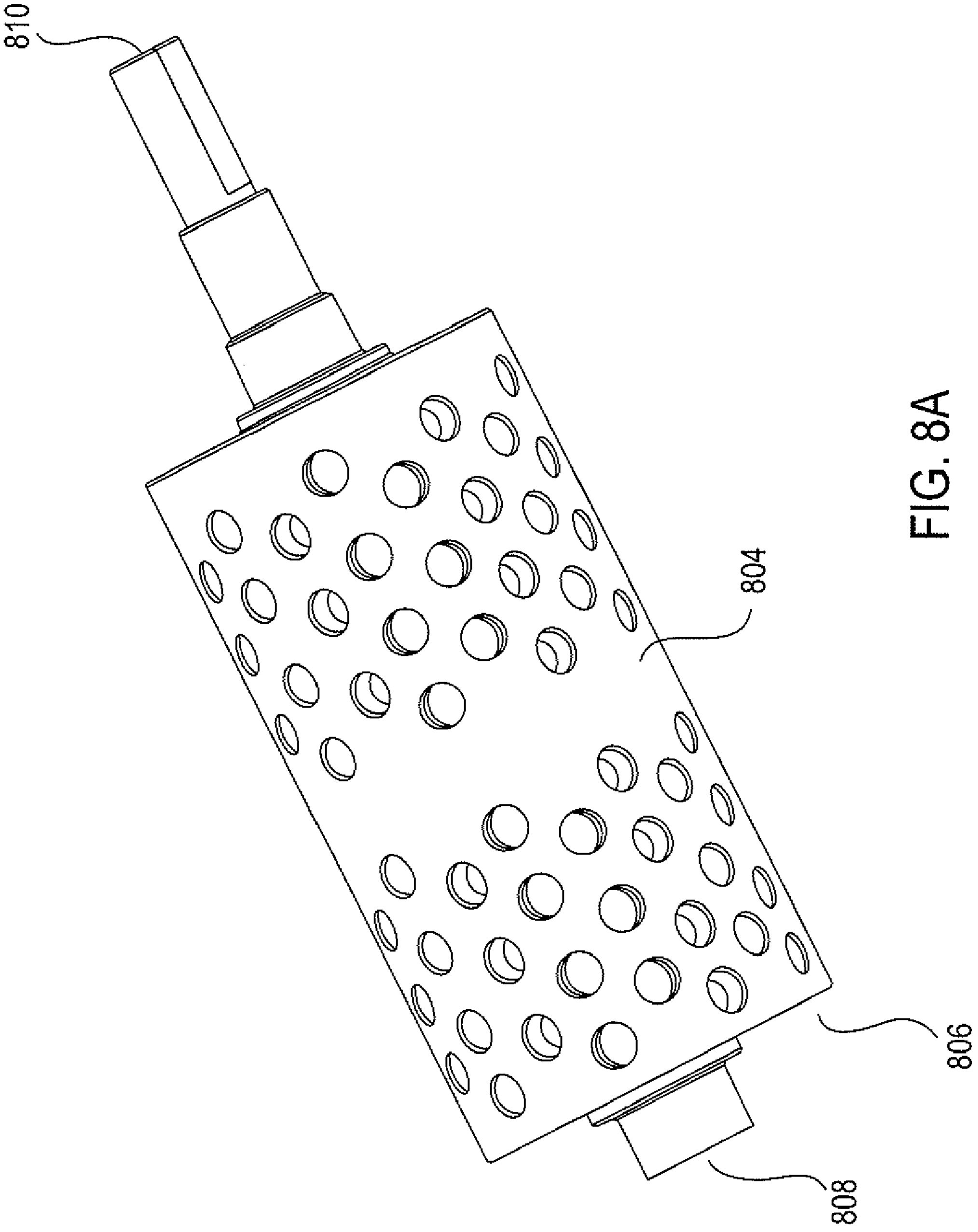
FIGS. 8A-B show two views of a fuel-refining-unit rotor.
Figure 8B:
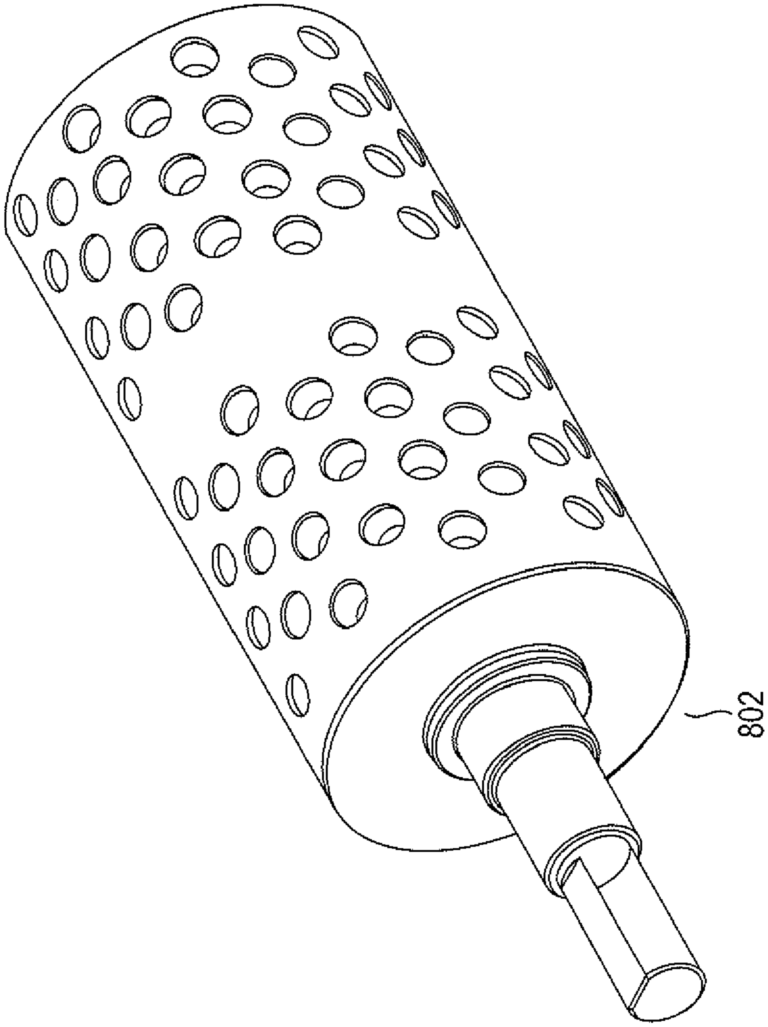

FIGS. 8A-B show two views of a fuel-refining-unit rotor. The rotor 802 includes a cylindrical fuel-processing surface, into which a number of radially-oriented depressions are machined, such as depression 806. The rotor includes a rotor shaft, on end of which 808 is ratably mounted in a complementary cylindrical mounting feature of the rotor-housing endplate, and the other end 810 of which is mounted through a coupling to the rotating shaft of a motor. The depressions, including depression 806, are arranged into a pattern on the cylindrical fuel-processing surface, with the pattern, diameter of the depressions, depth of the depressions, and shape of the depressions all potentially significant parameters with respect to the operational characteristics of the fuel-processing unit.

Figure 9A:
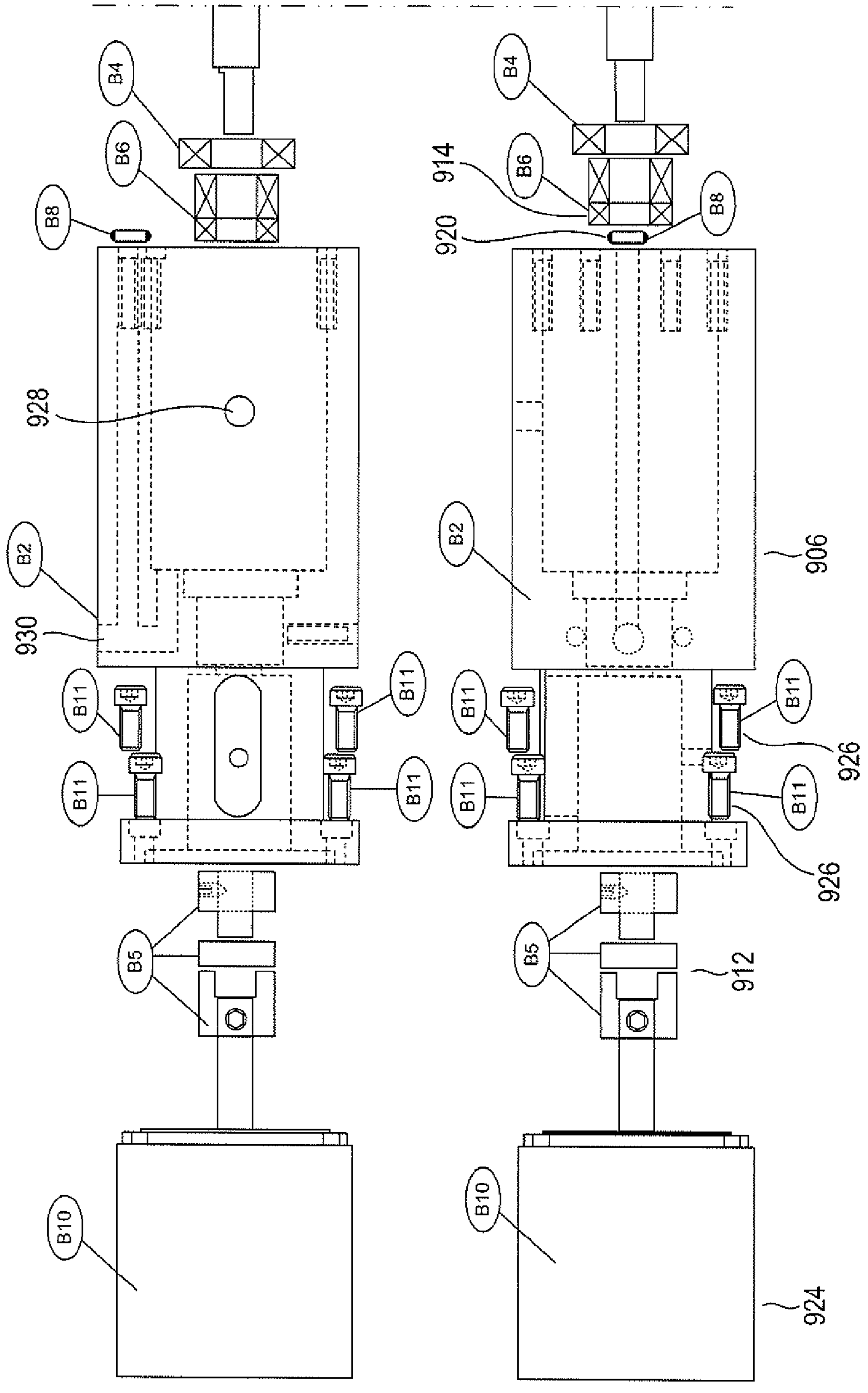
FIGS. 9A-B show exploded-view diagrams of a fuel-refining unit from two different perspectives.
Figure 9B:
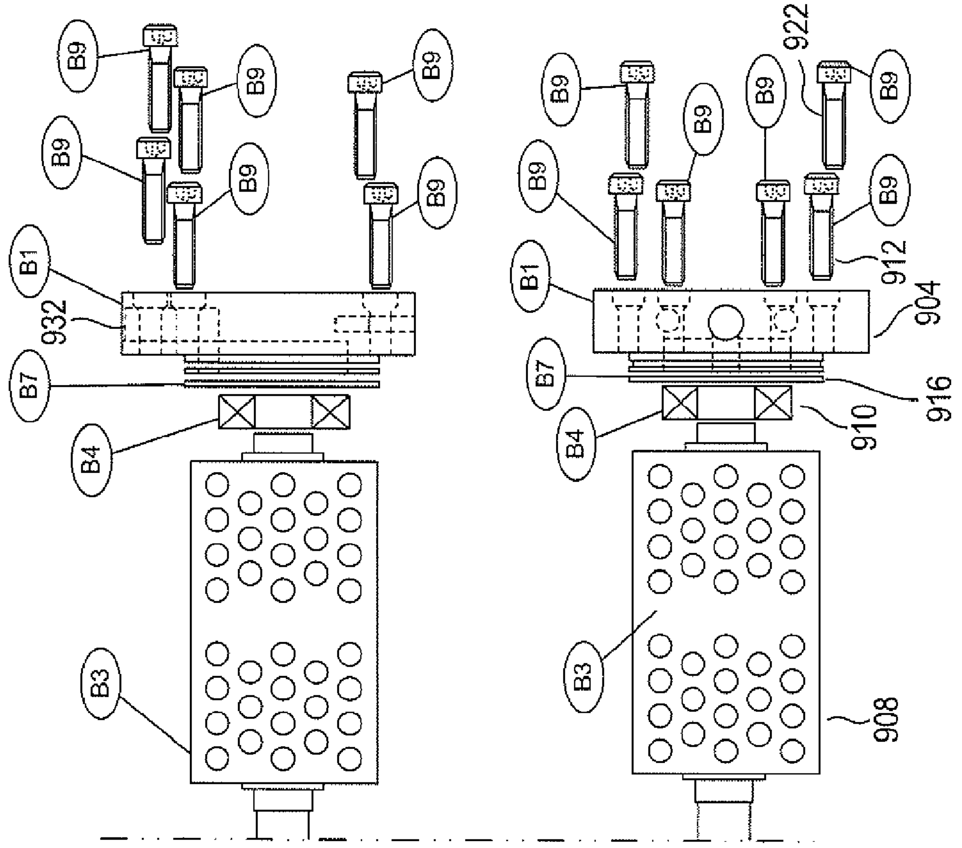

FIGS. 9A-B show exploded-view diagrams of a fuel-refining unit from two different perspectives. The figure is shown with alphanumeric labels defined in a FIG. key 902 of FIG. 9B. Numerical labels are additionally provided, and referred to in the following text. The exploded diagram of the fuel-refining unit shows many of the parts of the fuel-refining unit. These parts include: (1) a rotor-housing end cap 904; (2) a machined rotor-and-rotor-chamber housing 906; (3) a rotor 908; (4) a shielded bearing 910; (5) a spider coupling 912; (6) a pump seal 914; (7) a large-diameter "O" ring 916; (8) a small diameter "O" ring 920; (9) attachment bolts 922 that attach the rotor-housing end plate to the rotor-and-rotor-chamber housing; (10) an electric motor 924; (11) attachment bolts 926 that attach the motor-mount portion of rotor-housing end plate to the motor housing; (12) and exhaust port 928 from which fuel leaves the rotor chamber and is carried to reservoir tank B (414 in FIG. 4); and (13) inlet ports 930 and 932 through which fuel is introduced into the rotor chamber.

Figure 10:
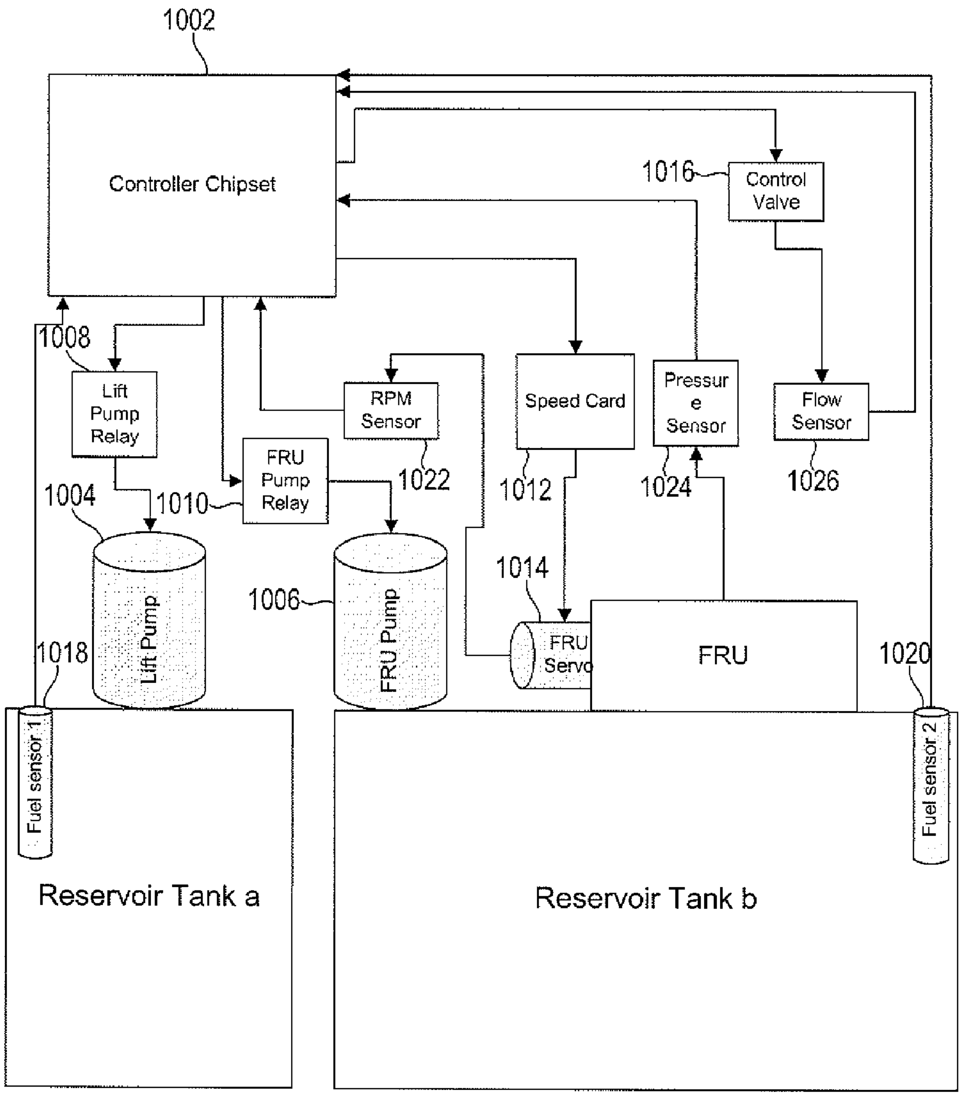
FIG. 10 shows the electronic control subsystem of an on-board fuel-refinement system.

FIG. 10 shows the electronic control subsystem of an on-board fuel-refinement system. The electronic control subsystem employs electrical input from a number of sensors and controls, and a control program, to dynamically start, stop, and vary parameters of the various active components of the on-board fuel-refining system of one example ERCCFRC in order to optimize refining for the current conditions of engine operation. The control program runs on the controller chipset 1002, and continuously emits electronic signals to: (1) the lift pump 1004 (402 in FIG. 4) and the fuel-refining-unit pump 1006 (408 in FIG. 4) through relays 1008 and 1010, respectively; (2) a speed card 1012 that inputs signals to a fuel-refining-unit servo 1014 in order to control rotor function, including rotor speed; and (3) a control valve 1016 that, when open, admits fuel from the fuel-refining-unit pump to the fuel-refining unit. The control program receives inputs from various sensors and monitors, including: (1) fuel sensors 1018 and 1020 (406 and 412 in FIG. 4, respectively); (2) a rotor RPM sensor 1022; (3) a pressure sensor 1024 that reports the pressure of fuel within the fuel-refining unit; and a fuel-flow sensor 1026 that reports the rate of fuel flow into the fuel-refining unit.

FIGS. 11A-E show tables of parameters that need to be considered at the design and operational stages of on-board fuel refining using an ERCCFRC. FIGS. 11A-C provide tables that show various design parameters that affect characteristics of the refined fuel output from the fuel-refining unit and input to the infernal-combustion engine of a motorized vehicle. FIG. 11D provides a table that shows various on-board-fuel-refining-system operational parameters that affect characteristics of the refined fuel output from the fuel-refining unit and input to the internal-combustion engine of a motorized vehicle. FIG. 11E provides a table of metrics, the values of which optimized by adjusting the parameters provided in FIGS. 11A-D in order to achieve optimal on-board fuel refining.

The table shown in FIG. 11A includes various rotor parameters, values for which are selected during design and trials of a degassing and cleaning fuel system. These rotor parameters include: (1) rotor circumference (or diameter, or radius); (2) rotor length; (3) pattern of rotor depressions; (4) depth of rotor depressions; (5) radii of rotor depressions; (6) shape of rotor depressions; (7) number of rotor depressions; (8) surface roughness of rotor; (9) composition of rotor; (10) mass of rotor; (11) percentage of ideal, cylindrical surface of rotor represented by depressions; and (12) rotor shape. In general, the depression-bearing surface of the rotor is cylindrical, but slight variations in the shape, including elliptical shapes and various patterns of longitudinal variations in radius are possible. The rotor surface and rotor depressions, spinning at high rates of revolution, induces fluid shear forces within the fuel in the rotor chamber, and may additional create cavitation. Cavitation produces extremely high, but short-duration temperatures that can induce a variety of chemical and physical changes of the fuel. Shear forces can also cause chemical changes, and the combined effects of pressurization and rotor forces may influence the types and quantities of dissolved gasses in the fuel, in addition to changing the chemical composition of the fuel. The above-listed parameters may all, separately or in various combinations, influence the fluid shear forces and amount of cavitation to which the fuel is subjected, as well as the amount of time that the fuel resides in the rotor chamber, average temperatures in the rotor chamber, and local temperatures produced by cavitation.

The table shown in FIG. 11B includes various fuel-refining-unit parameters, values for which are selected during design and trials of a degassing and cleaning fuel system. These rotor parameters include: (1) distance from the rotor surface to the inner surface of the rotor-and-rotor-chamber housing, d; (2) volume of the rotor-and-rotor-chamber housing; v; (3) the ratio d/v; (4) the number of inlet ports; (5) the spatial arrangement of inlet ports; (6) the diameter of inlet ports; (7) the shape of the inlet ports; (8) the number of exhaust ports; (9) the spatial arrangement of exhaust ports; (10) the diameter of exhaust ports; (11) the shape of the exhaust ports; (12) the shape of the inner-rotor-and-rotor-chamber housing; (13) composition of the rotor-and-rotor-chamber housing; and (14) roughness of the inner surface of the rotor-and-rotor-chamber housing. In general, the above-listed parameters principally affect the time to which fuel is exposed to refining conditions within the rotor chamber, temperature and pressure within the rotor chamber, and pressure of various gasses dissolved in, and in equilibrium with, the refined fuel. Fuel refining induces fluid shear forces within the fuel in the rotor chamber, and may additional create cavitation. The above-listed parameters may all, separately or in various combinations, influence the conditions to which the fuel is subjected in the rotor chamber, and therefore may affect the characteristics and parameters of the output, refined fuel.

The table shown in FIG. 11C includes various on-board-fuel-refining-system parameters, values for which are selected during design and trials of a degassing and cleaning fuel system. These on-board-fuel-refining-system parameters include: (1) volume of reservoir tank A; (2) volume of reservoir tank B; and (3) the diameters, lengths, and other characteristics of fluid connections between various stages and components of the on-board-fuel-refining-system. In general, the above-listed parameters principally affect the time to which fuel is exposed to refining conditions within the rotor chamber, temperature and pressure within the rotor chamber, and pressure of various gasses dissolved in, and in equilibrium with, the refined fuel.

The table shown in FIG. 11D includes various operational parameters of the on-board-fuel-refining-system, values for which are continuously adjusted during motor-vehicle operation. These operational parameters include: (1) fuel pressure within the rotor chamber; (2) rate of flow of fuel through the rotor chamber; (3) rotational velocity of the rotor; (4) pressures in reservoir tank A and B; (5) degree of vacuum in reservoir tank B; (6) average amount of fuel in each of reservoir tanks A and B, as well as thresholds for each reservoir tank that determine when corresponding pumps are activated or shut off; (7) rate of flow of fuel through reservoir tank B; (8) temperature within the rotor chamber; (9) the: temperature in reservoir tank B; (10) the type of fuel; and (11) composition of fuel, including nature and amounts of contaminants. In general, the above-listed parameters principally affect the time to which fuel is exposed to refining conditions within the rotor chamber; temperature and pressure within the rotor chamber, and pressure of various gasses dissolved in, and in equilibrium with, the refined fuel. All of these parameters may, alone or in various combinations, affect the composition and characteristics of the output, refined fuel.

The table shown in FIG. 11E includes various metrics that define how the above-mentioned parameters are adjusted in order to obtain optimal or near-optimal on-board fuel refining. These metrics include: (1) fuel efficiency, or miles/gallon; and (2) the concentration of various pollutant gasses in the exhaust gas emitted by the internal combustion engine. In certain cases, the pollutant gasses may be monitored during engine operation, while, in other cases, minimization of the concentration of pollutant gasses is carried out during on-board-fuel-refining-system design and implementation and during installation and tuning of an on-board-fuel-refining-system within a particular motorized vehicle. In general, the miles/gallon ratio is continuously monitored by the on-board-fuel-refining-system controller in order to adjust refining parameters to achieve greatest fuel efficiency.

Optimization of fuel efficiency and pollutant-gas emissions can be carried out by any of many different optimization techniques, from empirical and heuristics-based optimization to true, mathematical optimization using continuously computed differentials and a steepest-descent or other mathematical optimization technique. Optimization may be carried out continuously, at intervals, or may be carried out with all parameters at intervals and with continuous optimization of a smaller set of critical parameters.

Enclosed Rotor-Based Catalytic Cavitation Reactor

Further research and development efforts have revealed certain constraints and limitations in the on-board fuel-refinement system discussed above with reference to FIGS. 4-11E. The initial system, as shown in FIG. 9A, includes an external electric motor 924 coupled to the rotor shaft. The external electric motor presents numerous design challenges, including frictional energy losses due to the coupling, the bulk and lack of modularity associated with an external motor mechanically coupled to the rotor chamber, and challenges in sealing the rotor chamber to prevent fuel seepage and loss from the interior of the rotor chamber along the rotor shaft to the external environment. As a result of the realization of these design challenges and issues, through research, development, and implementation efforts, a new modular approach to design of the on-board fuel-refining system was conceived and has been developed.

Similarly, during research, development, and implementation efforts, a great deal of additional information has been collected and processed with regard to the principals of operation of the on-board fuel-refining system, discussed above with reference to FIGS. 4-11E. While it was initially recognized that the extremely high temperatures produced over extremely short intervals by cavitational processes generated by the radially oriented depressions in the rotor surface are instrumental in facilitating and accelerating physical and chemical processes that lead to on-board fuel refining, it has now been learned that homogeneous-catalyst properties of particular rotor surfaces also significantly contribute to the chemical transformations that occur during fuel processing. With that realization, many additional applications for the rotor-based reactor have been discovered and investigated. The rotor-based cavitation and catalytic reactor can be employed in a wide variety of different liquid-processing applications, include fuel refining, fuel reforming, water purification, physical and chemical separations of complex solutions and suspensions, including slurries processed during mining; operations and processing of industrial waste streams, desalination of salt water, any of a large number of chemical-reaction-based processing involving catalysis-facilitated reactions, and many other applications. The rotor-based cavitational and catalytic reactor provides highly efficient and high-throughput processing of a variety of different input liquids, features precise temperature-control capabilities, and provides for control of pressure and other parameters that, in turn, control chemical reactions and chemical processes.

Figure 12:
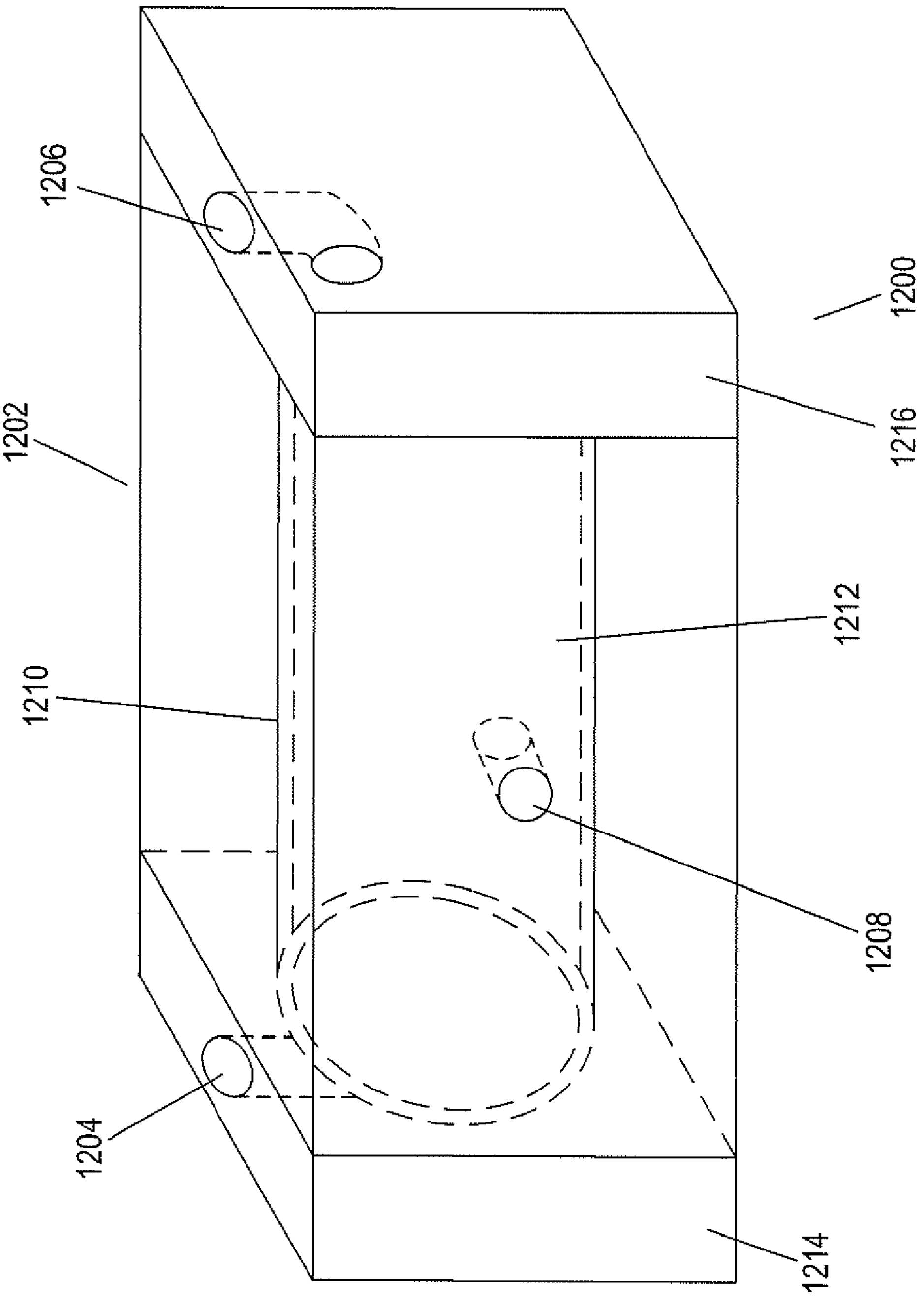
FIG. 12 provides an illustration of the components of an enclosed rotor-based cavitational and catalytic flow-through reaction chamber ("ERCCFRC") to which the current application is directed.

FIG. 12 provides an illustration of the primary components of an enclosed rotor-based cavitational and catalytic flow-through reaction, chamber ("ERCCFRC") to which the current application is directed. The ERCCFRC 1200 includes a housing 1202 which is sealed to prevent input of fluids into, or output of fluids out from, the enclosure or housing 1202 except through one or both input ports 1204 and 1206 and an output port 1208. The housing includes a fixed rotor sleeve 1210 within which a rotor 1212 is positioned. The rotor is spun at relatively high rotational speeds in order to accelerate a liquid, input through one or both input ports 1204 and 1206, within the narrow cylindrical space between the outer surface of the rotor and the inner surface of the rotor sleeve. The acceleration of the fluid leads to cavitation, mechanical shear and other fluid-mechanical forces, heating, pressurization, and exposure of the fluid to a heterogeneous catalyst or catalysts bound to, or incorporated within, the outer surface of the rotor, the inner surface of the rotor sleeve, the radial depressions within the rotor surface, and perhaps additional surfaces that form the inner surface of the chamber leading from the one or more input ports 1204 and 1206 to one or more output ports 1208. The rotor is mechanically spun by a motor contained within the enclosure or housing 1202, in one implementation contained within one of the end sections 1214 and 1216. Fluid communication with the reaction chamber occurs exclusively through one or more input ports and one or more output ports. The motor within the housing or enclosure can be electrically connected to an external circuit. The electrical interconnection is sealed and protected so that the electrical interconnection does not provide a pathway through which fluid can escape from within the reaction chamber to the environment external to the enclosure or housing 1202.

The ERCCFRC is constructed to allow one or both end sections 1214 and 1216 to be removed to allow for easy exchange of rotors and rotor sleeves. Because, in many implementations, the heterogeneous catalyst is bonded to, or embedded within, the rotor and rotor-sleeve surfaces, replacement of the rotor and/or rotor sleeve can change the mechanical and catalytic properties of the ERCCFRC to allow an ERCCFRC to be modified, in the field, for application to different types of physical and chemical processing of different types of fluids within different industrial, scientific, and commercial contexts.

The shape and dimensions of the ERCCFRC may vary significantly for different applications. Although the enclosure 1202 in FIG. 12 has a rectangular cross-section, the enclosure may be cylindrical, spherical, or have any of many other more complex shapes and cross-sections. While the reaction chamber in FIG. 12 is a cylindrical space between the outer surface and the inner surface of the rotor sleeve, both the rotor sleeve and rotor may have alternative shapes and dimensions in different implementations. In general, the rotor sleeve is stationary while the rotor, moves, at relatively high angular velocities, with respect to the stationary rotor sleeve to accelerate the fluid within the reaction chamber, resulting in mechanical shearing, cavitation, and other effects. Dimensions of the input and output ports may also vary in different implementations. The patterns, shapes, and dimensions of the radial depressions in the rotor surface may be varied to produce different effects on fluids within the reaction chamber, including different levels of cavitation and cavitationally induced heating. In certain implementations, the inner surface of the rotor sleeve may contain radial depressions and the external surface of the rotor may be smooth, and in yet additional implementations, there may be radial depressions in both the surface of the rotor sleeve and the outer surface of the rotor. In certain applications, fluid is introduced, under pressure, into the input ports while, in other applications, rotation of the rotor may generate a force that draws fluid into the input ports and expels fluid from the output ports.

Figure 13A:
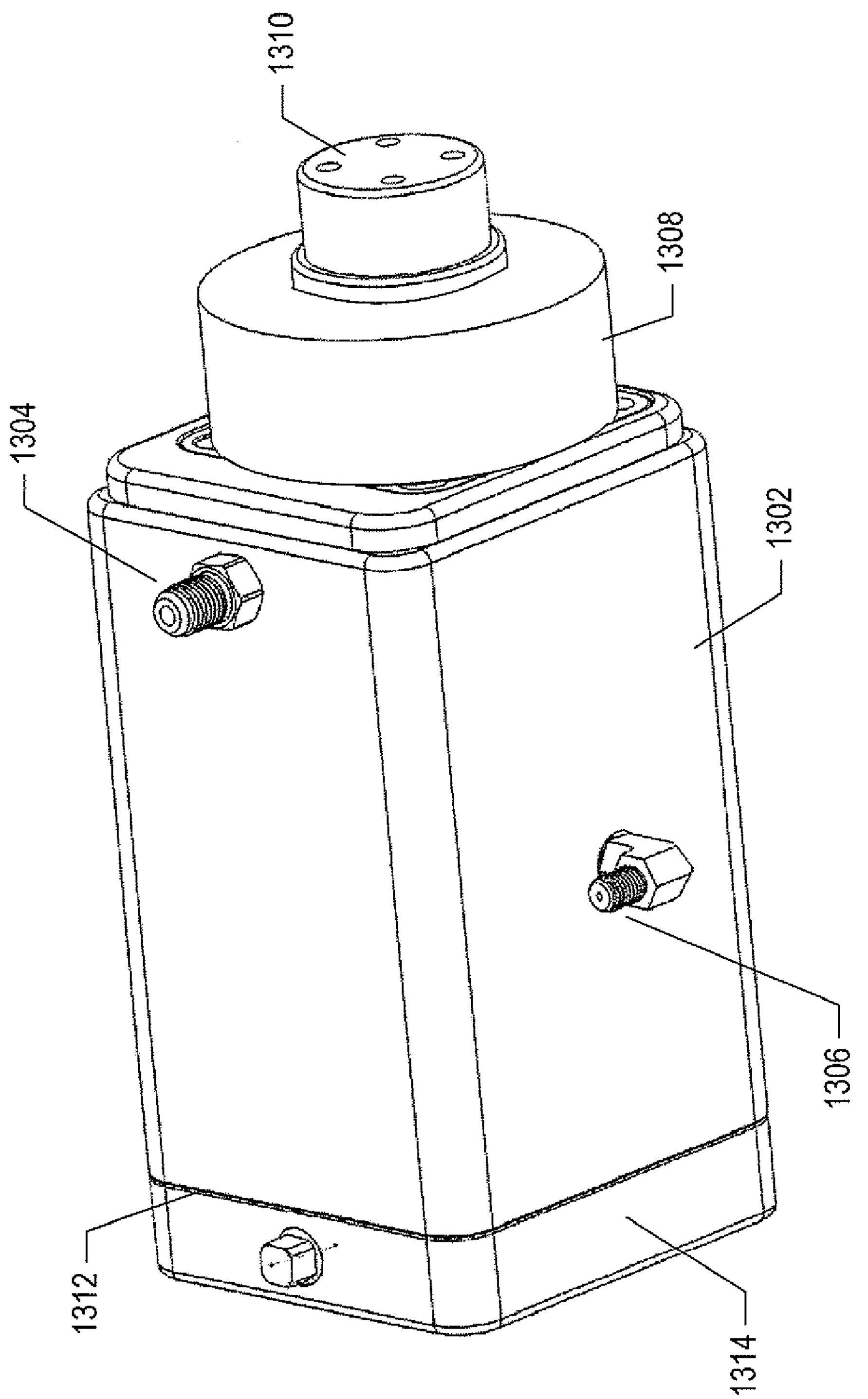
FIGS. 13A-N illustrate one implementation of the ERCCFRC.
Figure 13B:
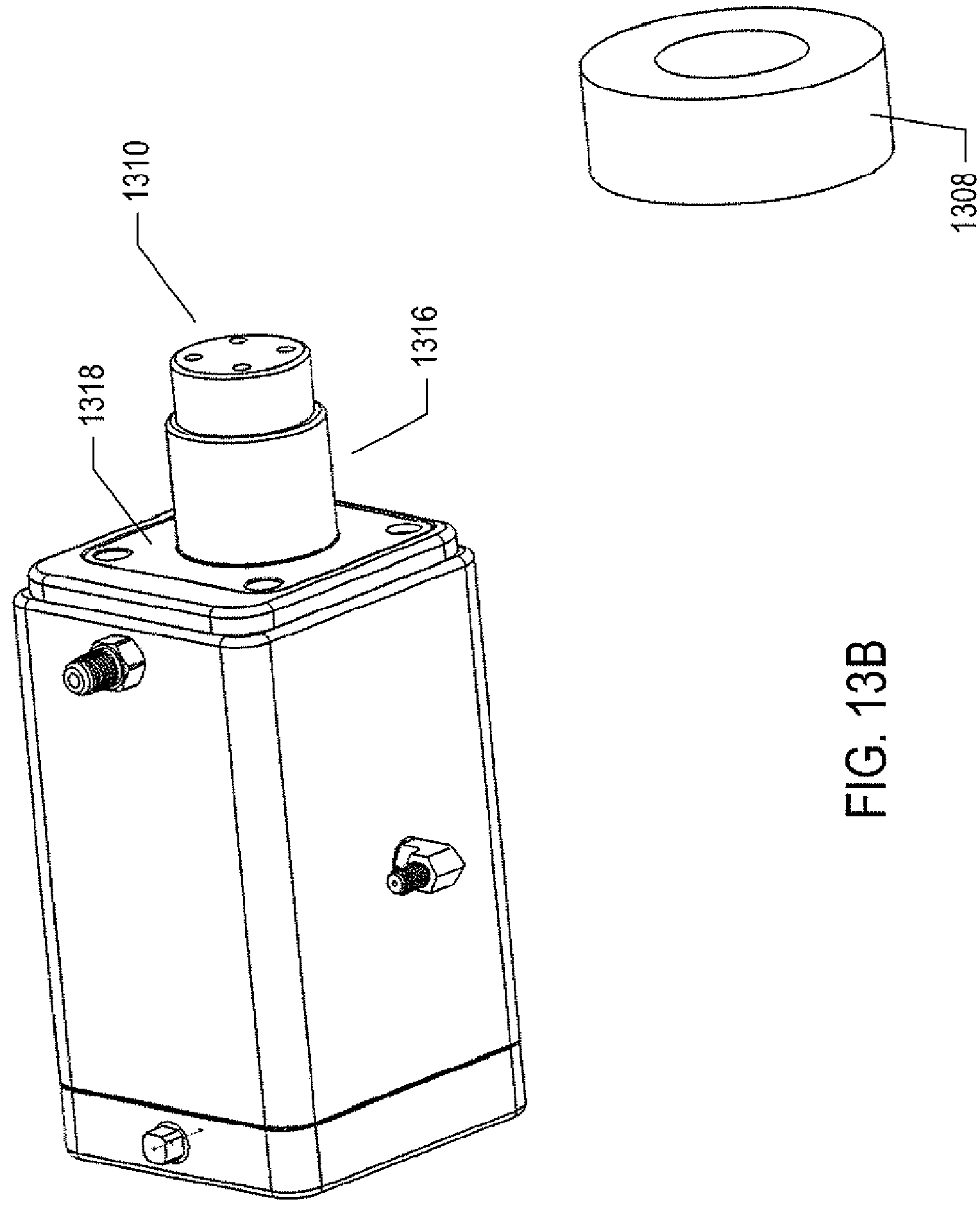
Figure 13C:
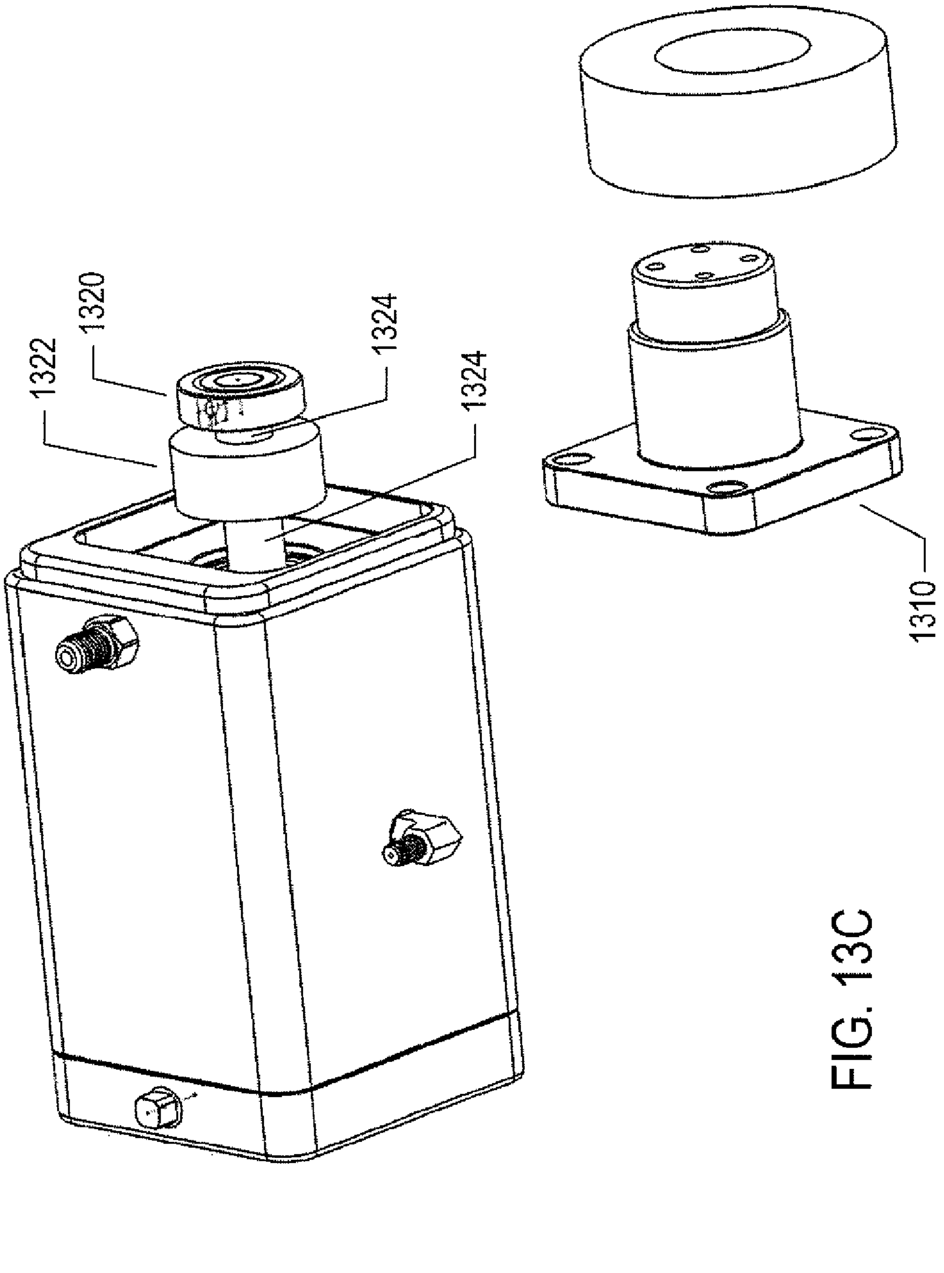
Figure 13D:
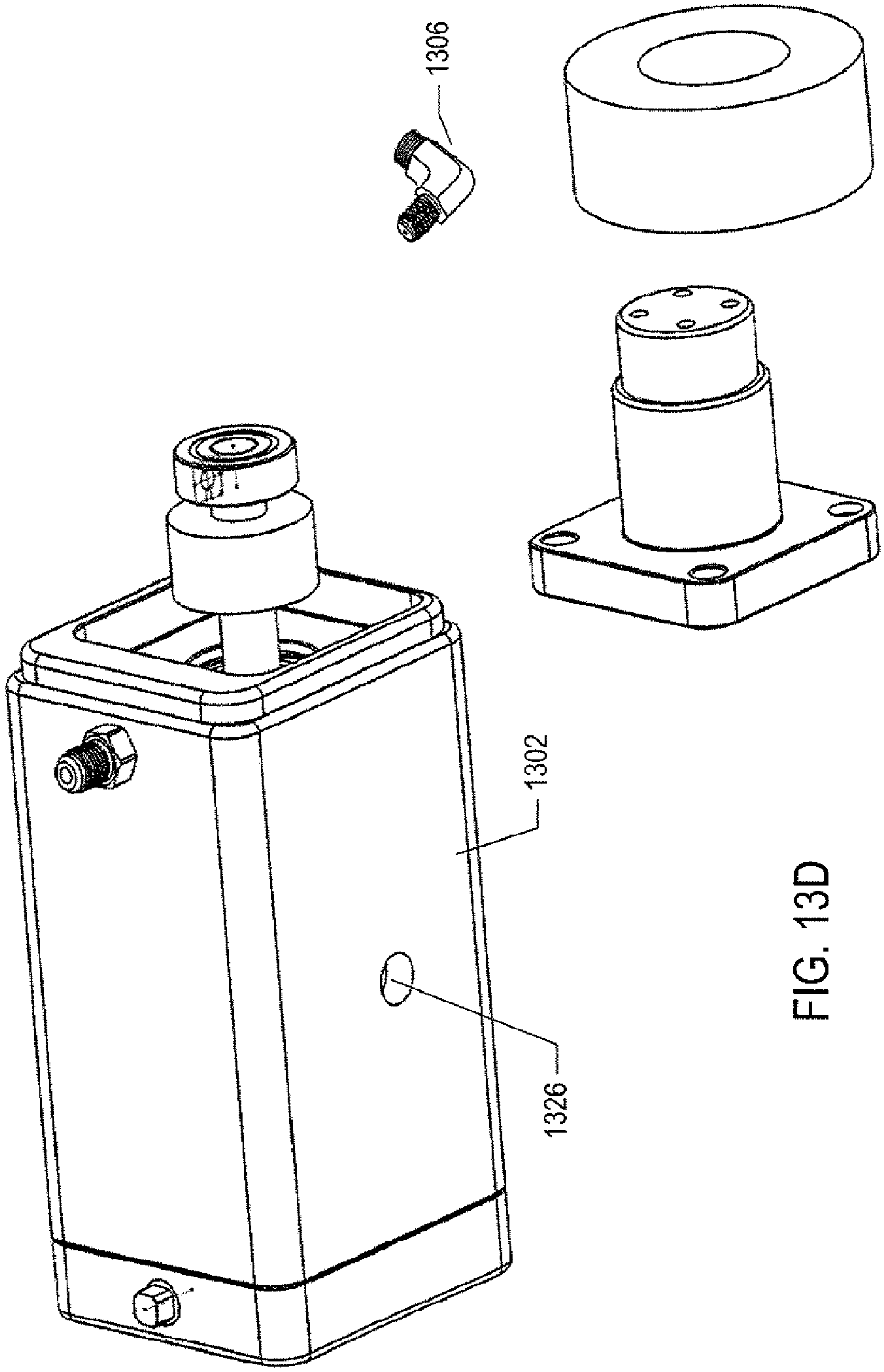
Figure 13E:
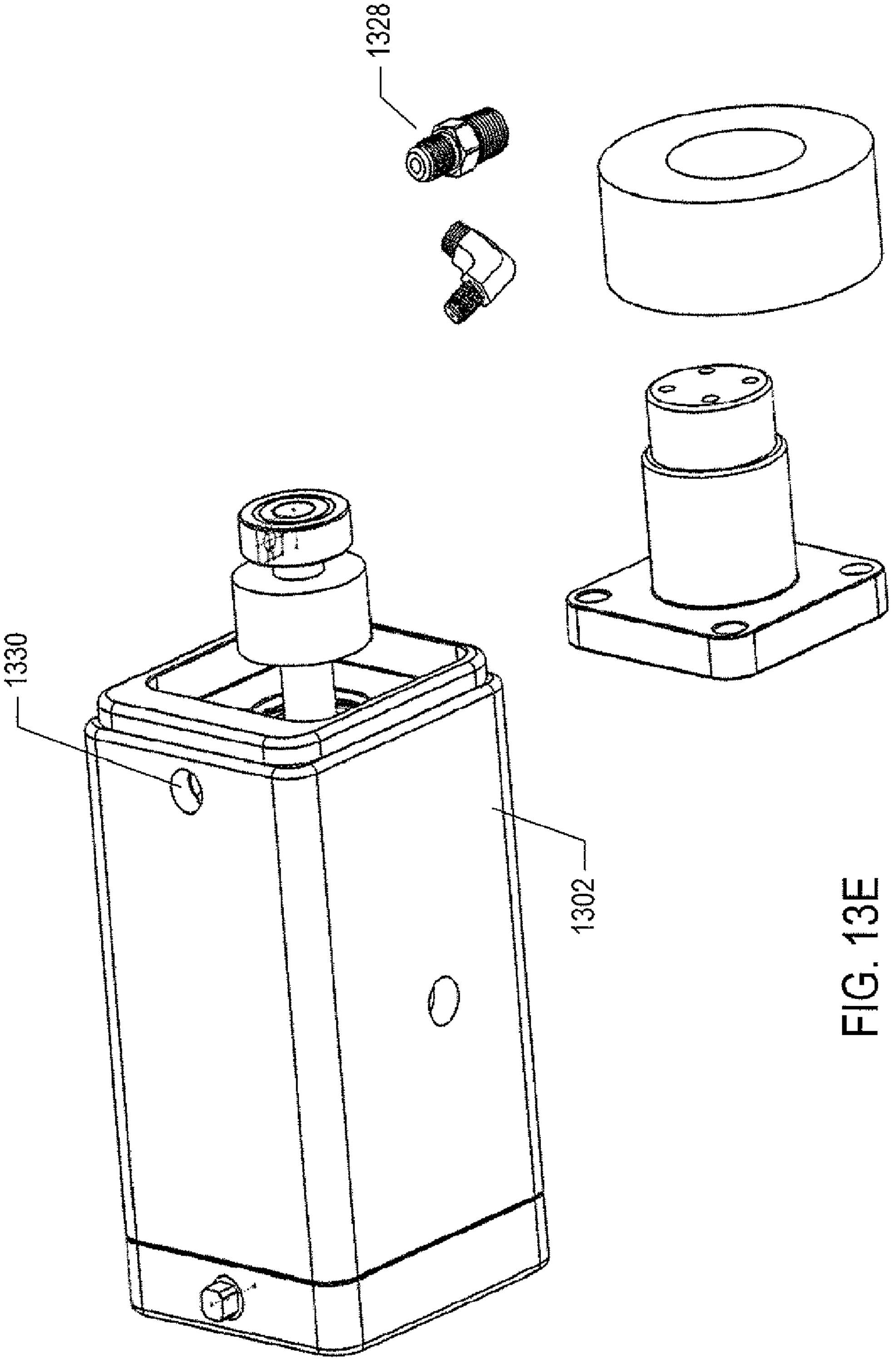
Figure 13F:
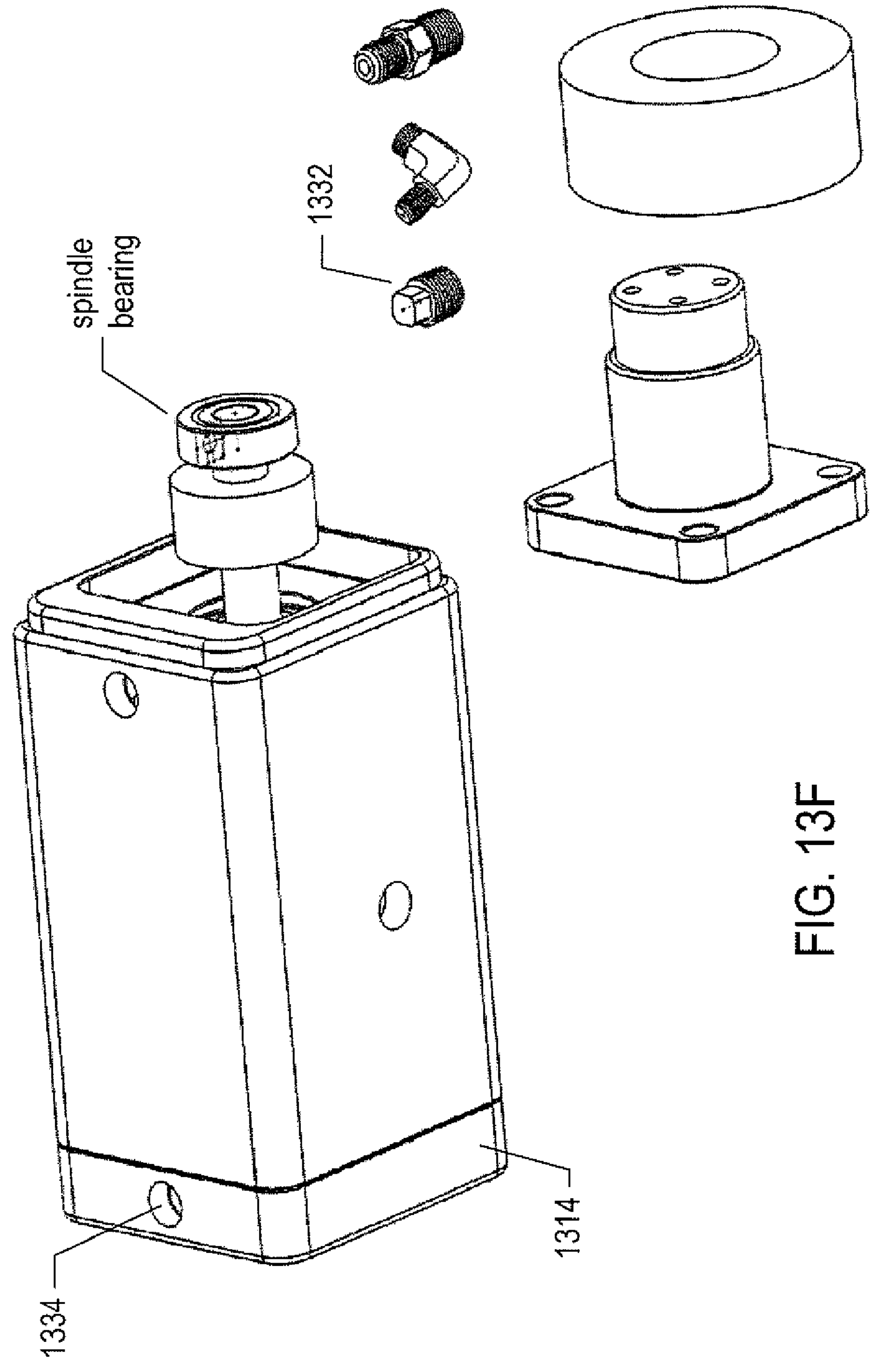
Figure 13G:
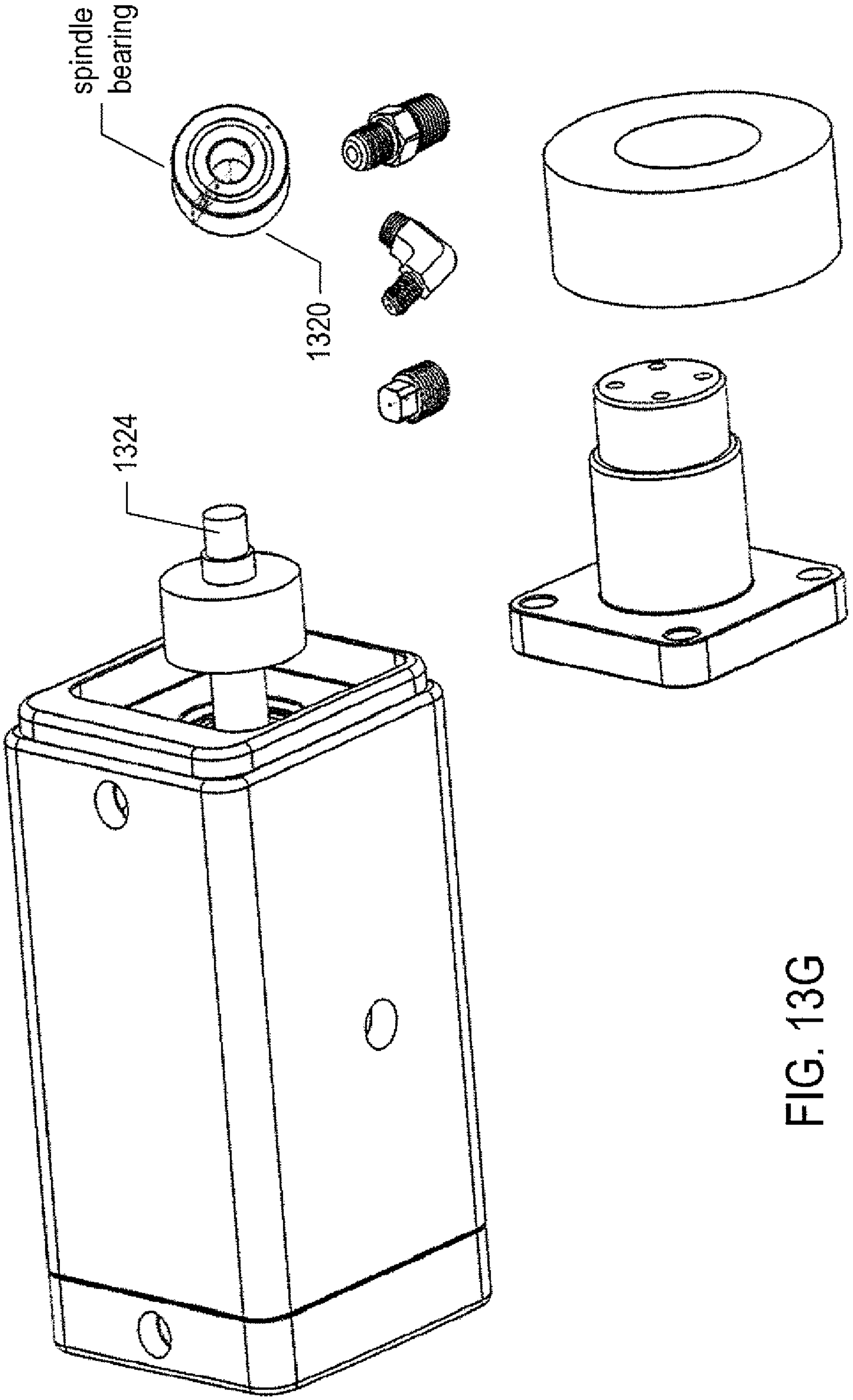
Figure 13H:
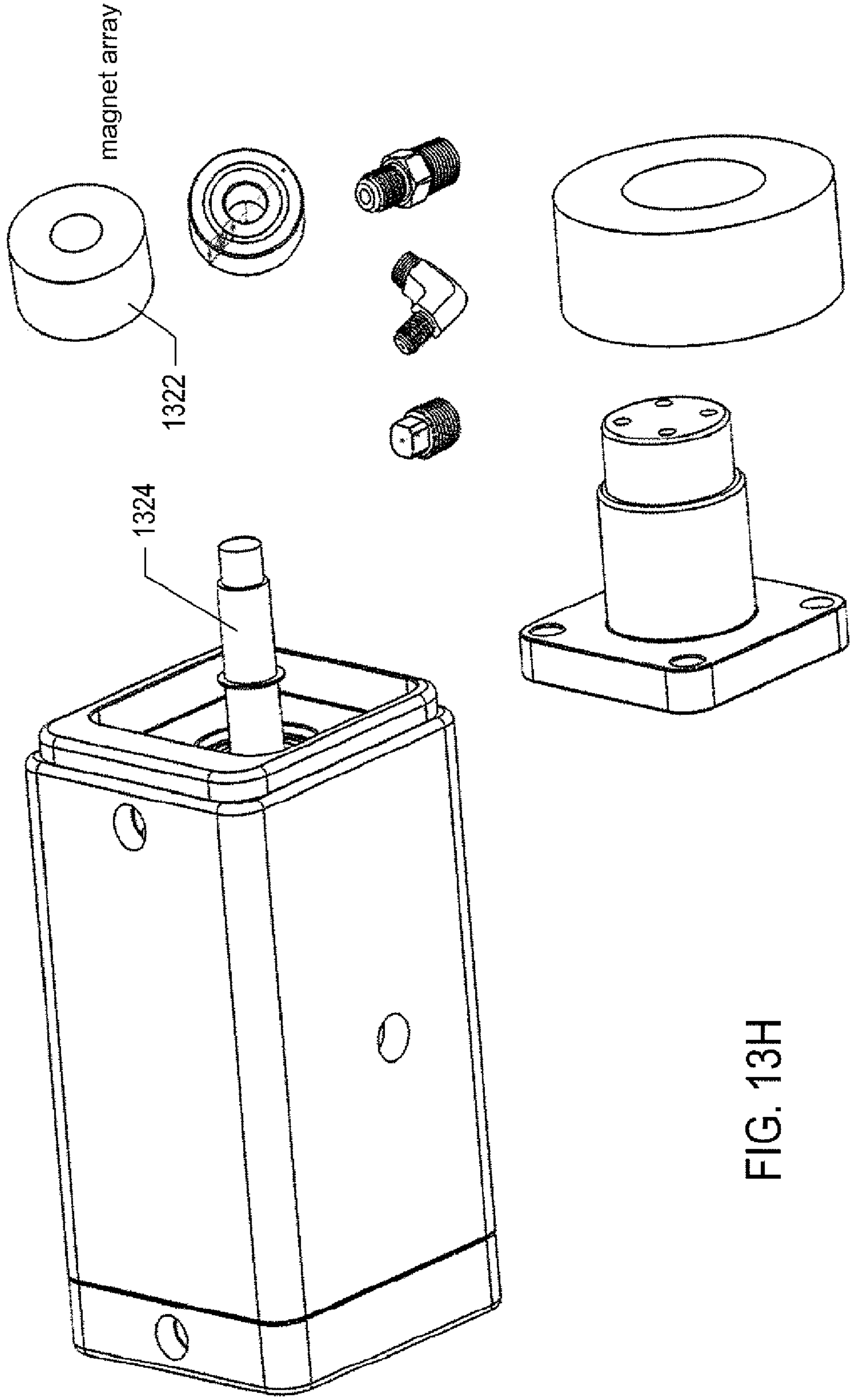
Figure 13I:
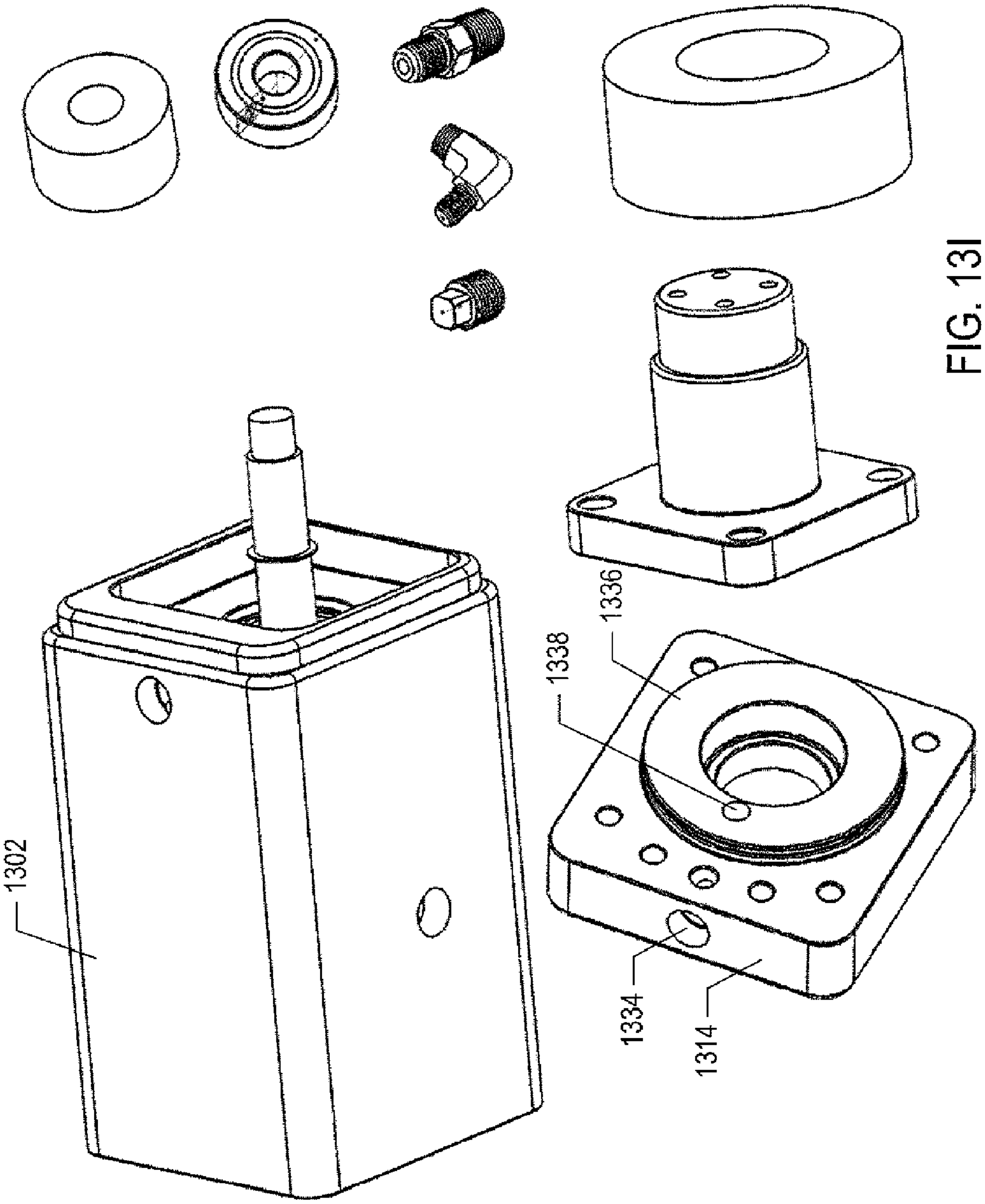
Figure 13J:
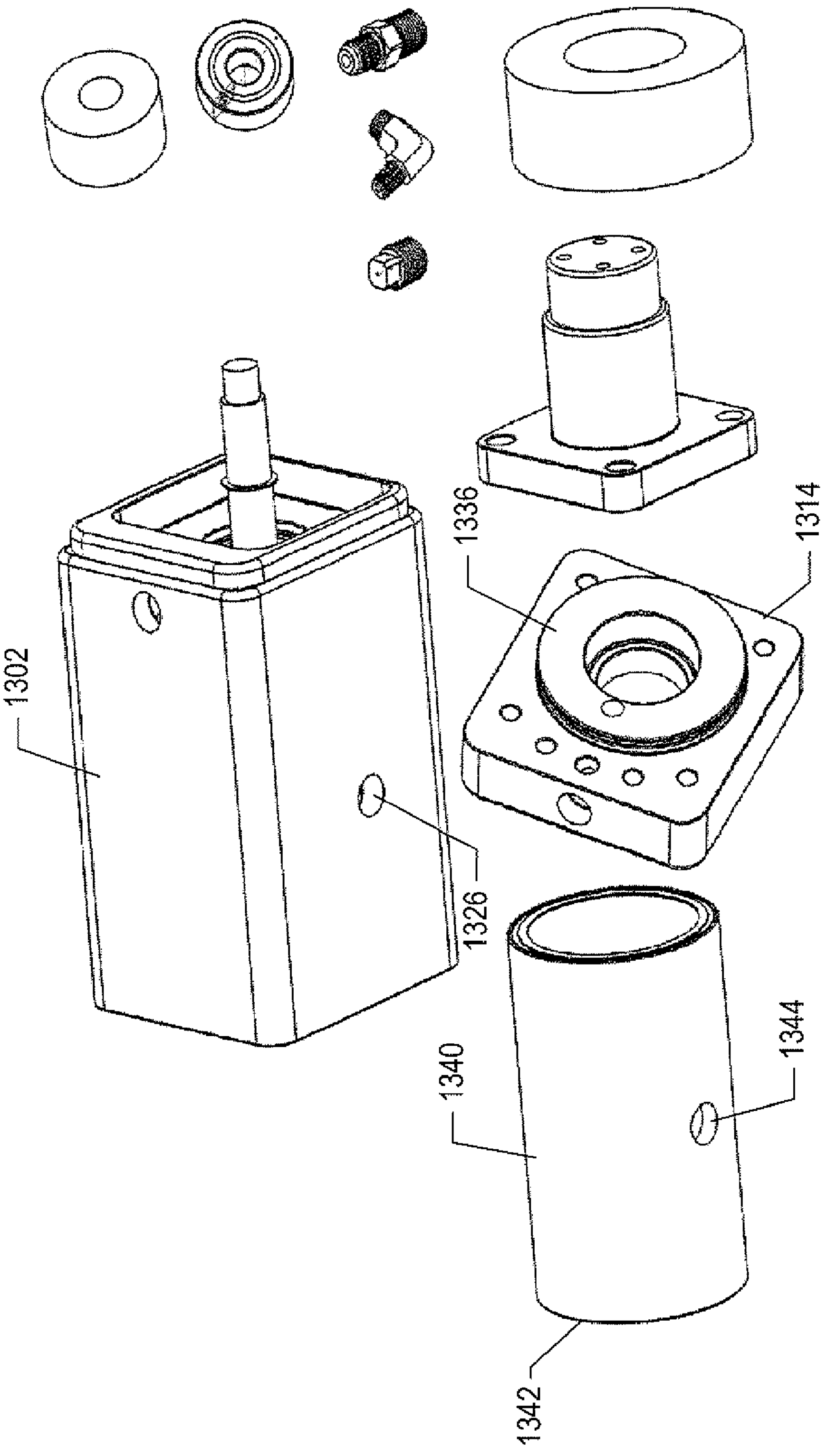
Figure 13K:
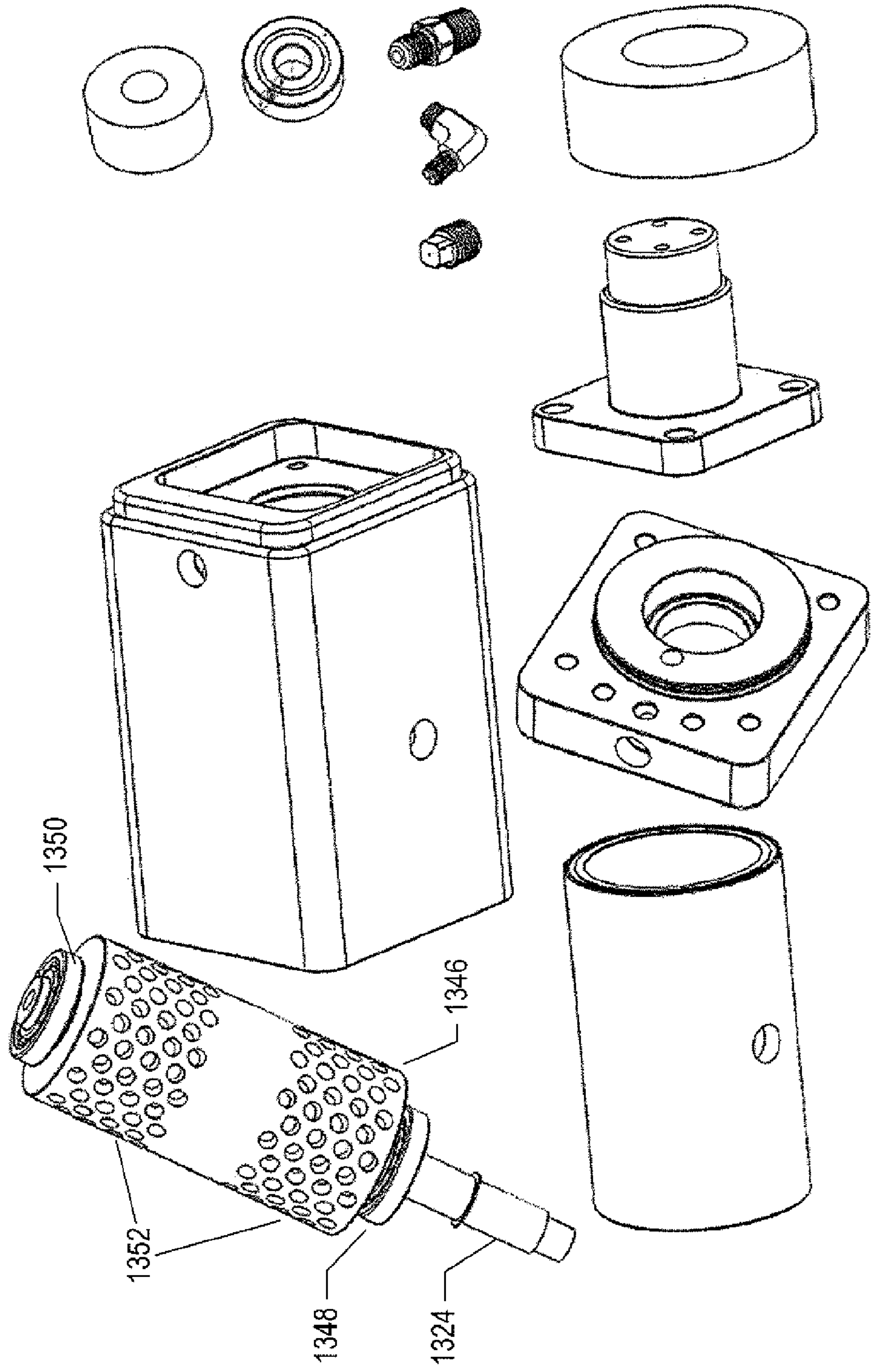
Figure 13L:
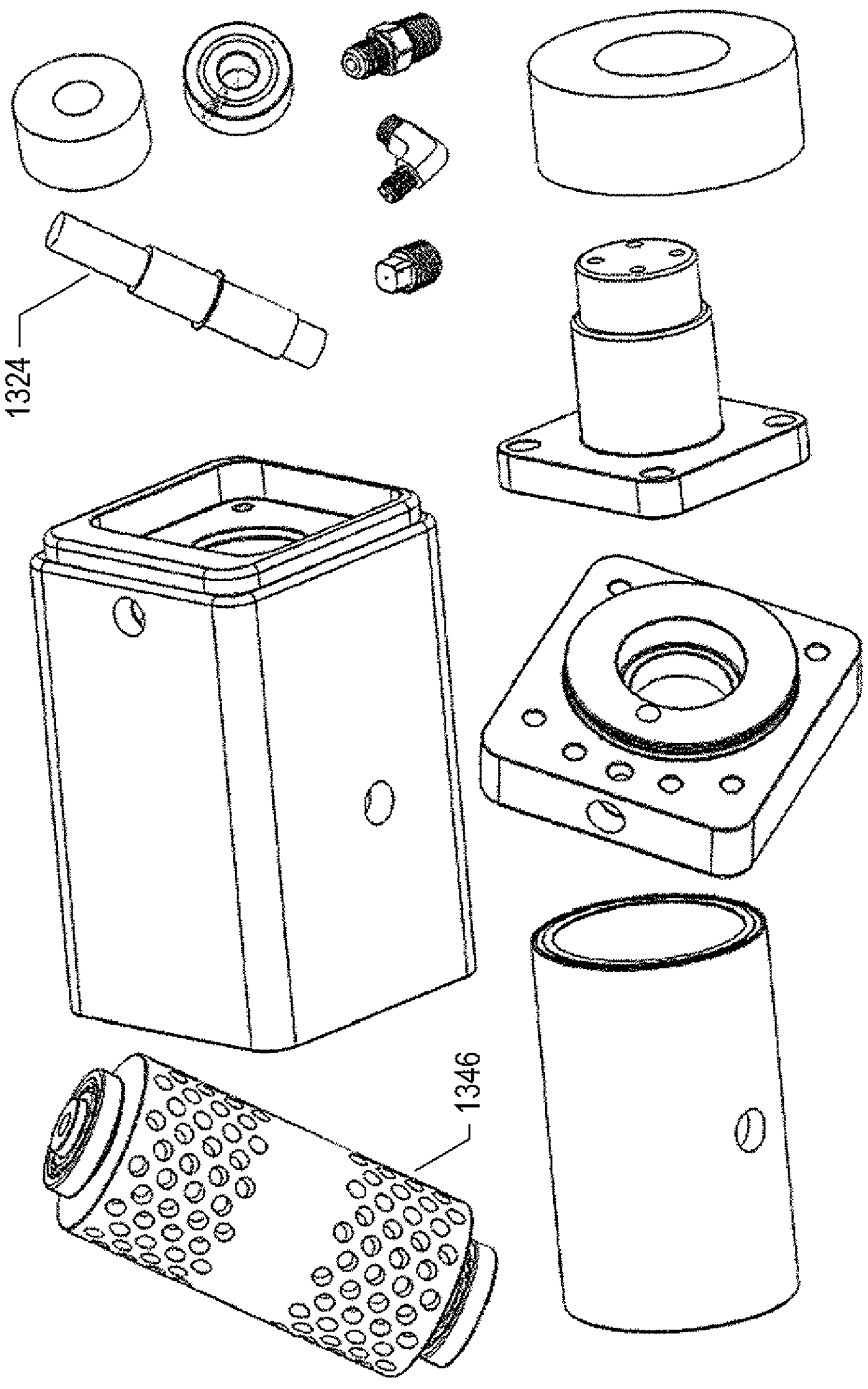
Figure 13M:
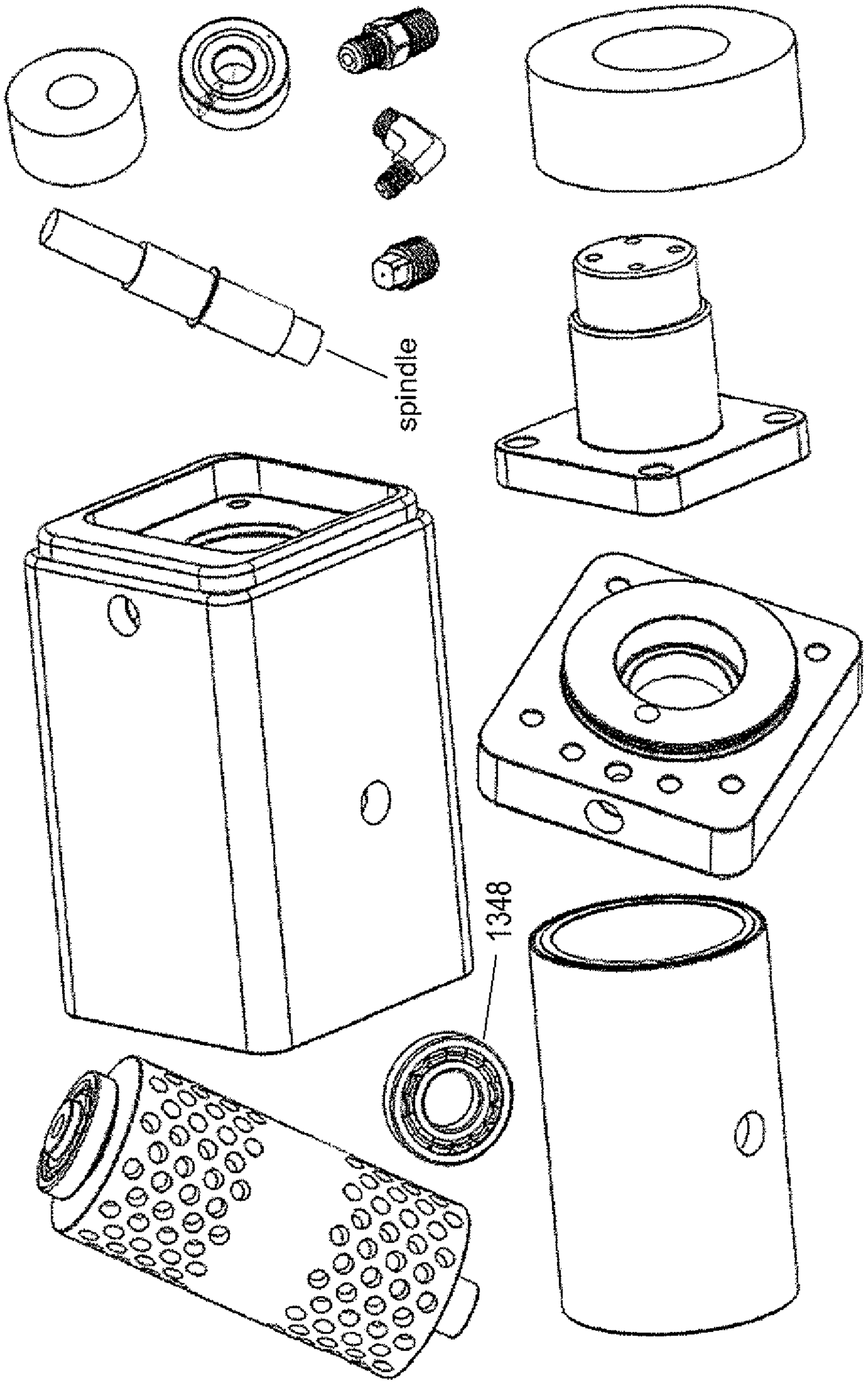
Figure 13N:
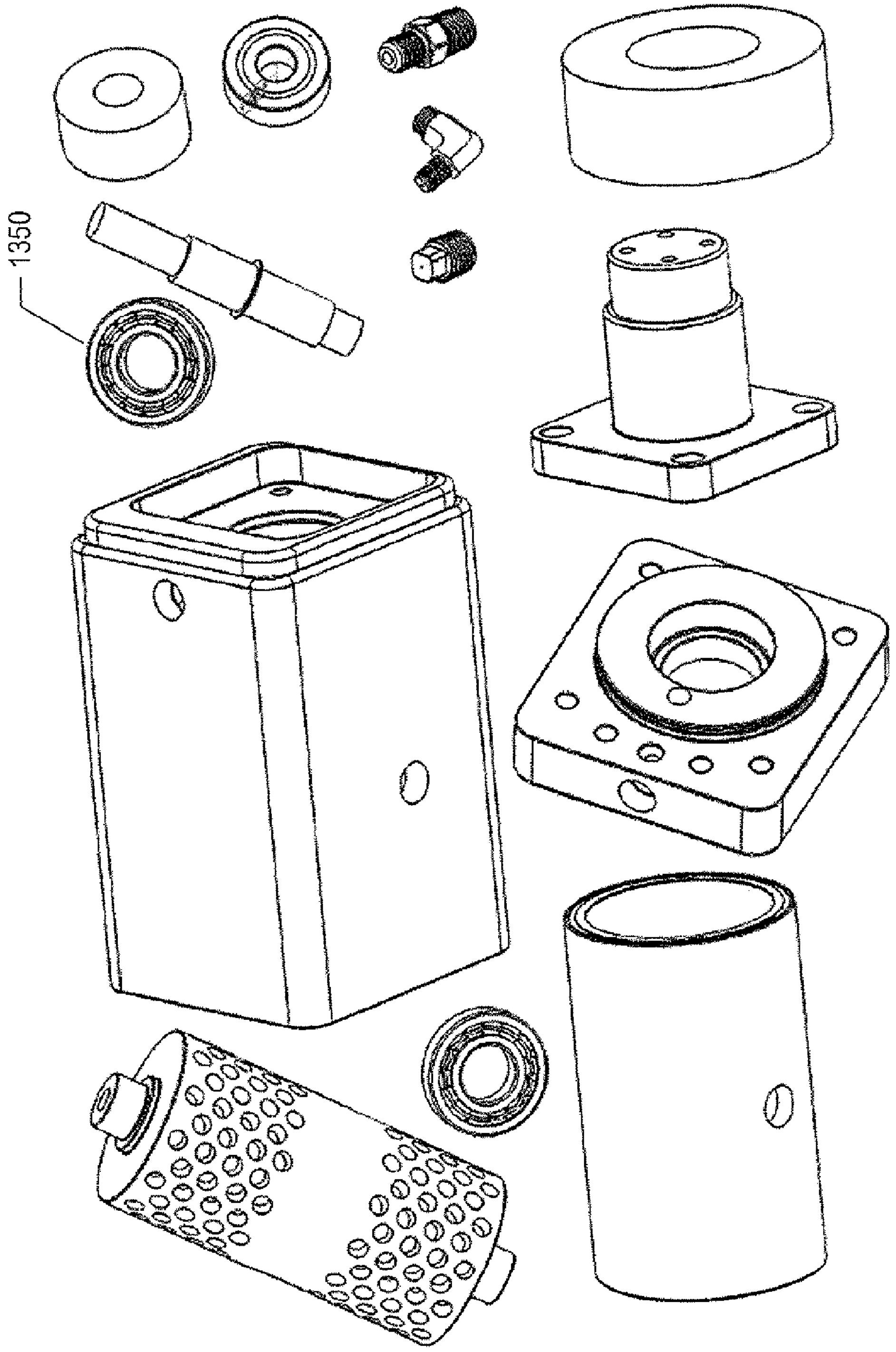

FIGS. 13A-N illustrate one implementation of the ERCCFRC. The figures show a disassembly sequence in which the ERCCFRC is disassembled in order to illustrate interrelationships between various parts. The external appearance of the ERCCFRC, shown in FIG. 13A, is similar to the external appearance of the on-board fuel-refining system, shown in FIG. 5. The ERCCFRC can be seen, in FIG. 13A, to include an external housing or enclosure 1302, a threaded input-port adaptor 1304, a threaded output-port adaptor 1306, a cylindrical coil pack, or alternating-current ("AC") electric motor stator 1308, and a forward, cylindrical end of a snoot 1310. Also visible in FIG. 13A is a line 1312 representing the boundary between the rear end cap 1314 and the housing 1302.

In FIG. 13B, the coil pack, or AC-motor stator 1308 is removed from the ERCCFRC, exposing the entire cylindrical portion 1316 of the snoot 1310 as well as the external surface of the end plate 1318 of the snoot. In FIG. 13C, the snoot 1310 is removed from the ERCCFRC to reveal a spindle bearing 1320, cylindrical magnet array 1322, and spindle shaft 1324 on which the spindle bearing and cylindrical magnet array are mounted.

In FIG. 13D, the output-port adaptor 1306 has been removed to expose the output port 1326 in the housing 1302. In FIG. 13E, the input-port adaptor 1328 has been removed from the ERCCFRC to reveal the input port 1330 in the housing 1302. In FIG. 13F, a threaded plug 1332 has been removed from the ERCCFRC to reveal a second input port 1334 in the end cap 1314.

In FIG. 13G, the spindle bearing 1320 is removed to reveal more of the spindle 1324. In FIG. 13H, the cylindrical magnet array 1322 is removed from the ERCCFRC to reveal the entire spindle 1324. In FIG. 13I, the rear end cap 1314 has been removed from the housing 1302, revealing an annular feature 1336 to which the rotor sleeve, discussed further below, is mounted. In addition, the internal reaction-chamber outlet 1338 from the second input port 1334 is visible in FIG. 13I.

In FIG. 13J, the rotor sleeve 1340 has been removed from the ERCCFRC. When mounted within the ERCCFRC, the left-hand end 1342 of the rotor sleeve mounts to the annular feature 1336 of end cap 1314. The right-hand end of the rotor sleeve mounts to a similar annular feature within the enclosure. Note that the rotor sleeve includes a threaded internal port 1344 that, when the rotor sleeve is mounted within the ERCCFRC, provides fluid communication to the external output port 1326 in the housing 1302. In FIG. 13K, the rotor 1346 has been removed from the ERCCFRC. The rotor includes the spindle 1324 and a front rotor bearing 1348 and a rear rotor bearing 1350. Note the pattern of radial depressions 1352 in the external surface of the rotor. These radial depressions, cylindrical in shape in FIG. 13K, generate cavitation and fluid mechanical forces in the rapidly spinning fluid within the reaction chamber.

In FIG. 13L, the spindle 1324 has been removed from the rotor 1346. In FIGS. 13M and 13N, the front rotor bearing 1348 and the rear rotor bearing 1350 are removed from the rotor. Thus, FIGS. 13A-N illustrate disassembly of the ERCCFRC and the various mechanical components contained within the ERCCFRC.

Figure 14:
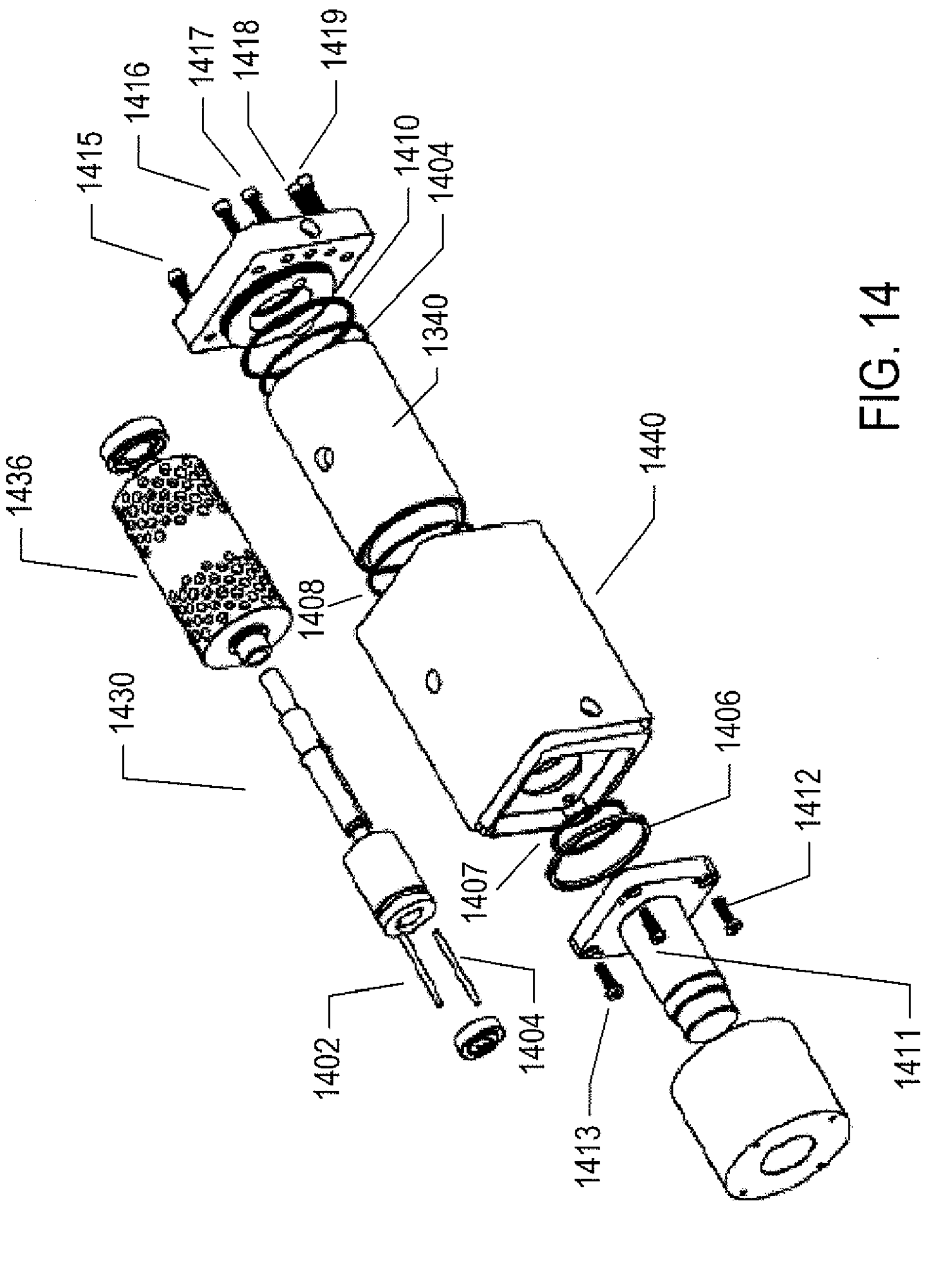
FIG. 14 provides an exploded view of one implementation of the ERCCFRC.

FIG. 14 provides an exploded view of one implementation of the ERCCFRC. The exploded view reveals two magnet array pins 1402 and 1404 that function to secure the cylindrical magnet array to the spindle. FIG. 14 also reveals a number of gaskets 1406-1410 that provide a tight fluid seal to contain fluid within the reaction chamber as well as numerous bolts 1412-1419 that secure the snoot and end cap to the housing. In FIG. 14, the spindle, circular magnet array, and rotor assembly 1430 is shown above the housing assembly 1440. The rotor and spindle assembly fits within the rotor sleeve 1340 in the fully assembled ERCCFRC. The cylindrical magnet array 1322 and AC-motor stator 1308 together comprise an AC motor.

As discussed above, cavitation produces extremely brief, high-temperature neighborhoods within a fluid and brief pulses of high-energy electromagnetic radiation that can initiate a variety of different physical and chemical transformations. Cavitation is a well-known side effect of various mechanical systems that operate within fluids, including impellers and propellers, often leading to serious wear and damage to mechanical surfaces. The temperatures produced by rapidly imploding bubbles, produced by cavitation, can reach many thousands of degrees Centigrade. The radial depressions and other features patterned onto the outer surface of the rotor and internal surface of the rotor sleeve can be designed to produce a variety of different levels of cavitation to precisely control the chemical processes initiated and facilitated by cavitation within the fluid within the reaction chamber of the ERCCFRC.

The external surface of the rotor and the internal surface of the rotor sleeve can be processed to produce heterogeneous-catalyst coatings and impregnations in order to expose the fluid rotating within the reaction chamber to one or more catalysts in order to facilitate selected chemical reactions. A wide variety of catalytical materials may be employed, including a wide variety of different transition metals, transition-metal alloys, transition-metal-containing clusters, transition-metal oxides, transition-metal salts, and even various organic compounds with catalytic properties. The examples include radium oxides, iron oxides on alumina, platinum/rhodium complexes, nickel plated on potassium oxide, silver plated on alumina, titanium and magnesium chlorides, and molybdenum cobalt complexes on alumina. Transition-metal catalysts may include: Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Lanthanum, Hafnium, Tantalum, Tungsten, Rhenium, Osmium, Iridium, Platinum, Gold, and Mercury. Catalytic carbonyl clusters include: $Mn_2(CO)_{10}$; $Fe_3(CO)_{12}$; $Co_4(CO)_{12}$; $Rh_4(CO)_{12}$; $CFe_5(CO)_{15}$; $Rh_6(CO)_{16}$; and $Os_6(CO)_{18}$.

The ERCCFRC provides self-cleaning catalytic surfaces. Because of the cavitation and mechanical forces produced by the rotor motion within the fluid, much of the deposits, including coking, that would normal form on the catalytic surfaces and degrade the catalytical activity of the catalytic rotor and rotor-sleeve surfaces is continuously removed during operation of the ERCCFRC. This self-cleaning property greatly extends the life and increases the effective catalytic properties of the ERCCFRC.

As mentioned above, because it is possible to control the temperature, pressure, and other physical and chemical parameters within the reaction chamber by selecting particular patterns and types of radial depressions, rotor speeds, fluid-input and fluid-output pressures, and the shape and dimensions of the reaction chamber. The ERCCFRC can be applied to many different types of chemical processing and fluid-mechanical processing of a variety of different types of fluids. As one example, the ERCCFRC can be used to reform distillation fractions from petroleum refining to increase the octane numbers of the distillation fractions. Various types of reforming processes are known, including thermal reforming and catalytic reforming. The ERCCFRC can be employed for either thermal reforming or catalytic reforming as well as for hybrid reforming methods that employ both increased temperatures and pressures as well as the presence of catalysts. In other applications, the ERCCFRC can be used to carry out specific chemical reactions, including hydrogenation and dehydrogenation of organic solvents and organic molecules dissolved in solvents, various types of oxidation and reduction reactions, isomerization reactions, physical and chemical separations, generation of high-temperature fluids for a diverse array of applications, including heating, desalination of salt water and brackish water, desulphurization of hydrocarbon fuels, cracking of crude hydrocarbon fuels, generation of dispersions, gels, and solutions, separation and recovery of solutes and solvents from solutions, destruction of pathogens, and many other physical and chemical processes. The ERC- CFRC can incorporate many of a variety of different types of catalysts that can be bonded to, plated on, or incorporated within the rotor surface and rotor-sleeve surface.

The ERCCFRC may be incorporated into a wide variety of physical and chemical processing systems, fluid circuits, and electrical circuits. In the ERCCFRC implementation discussed above with reference to FIGS. 13A-N and 14, an AC motor comprising a cylindrical stator and a cylindrical magnet array is incorporated within, and fully enclosed by, the housing of the ERCCFRC in order to rotate the rotor at relatively high speeds. The AC motor is generally electrically connected to a variable-speed drive or other controller, a power supply, and often to a higher-level processor-based process-control system. The ERCCFRC may be interconnected with, or cooperate with, various pumps, filters, thermal-control systems, pressure-control systems, and other components of chemical and physical processing systems. The ERCCFRC may be used within vehicles and other mobile devices and systems as well as in stationary applications, including petroleum refining, water processing, and other stationary devices and systems. The components of the ERCCFRC may be manufactured from a variety of different types of materials, including metals, ceramics, polymers, and other types of materials.

Although the present invention has been described in terms of a particular embodiment, it is not intended that the invention be limited to this embodiment. Modifications within the spirit of the invention will be apparent to those skilled in the art. Many different types of optimization techniques and parameter-monitoring and parameter-adjustment techniques may be used to tailor on-operation of an ERCCFRC to specific applications. As discussed above, an ERCCFRC may include many different types of catalysts and may have many different dimensions, volumes, radial-depression patterns, and variation in these and other implementation and design parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An enclosed rotor-based cavitational and catalytic flow-through reaction chamber comprising:
- a fluid-impermeable enclosure with at least one fluid-input port and at least one fluid output port;
- a rotor sleeve, mounted within the enclosure, having a catalytic inner surface;
- a rotor mounted within the rotor sleeve to form a reaction chamber between the outer surface of the rotor and the inner surface of the rotor sleeve, the rotor having a catalytic outer surface; and
- a motor, mounted within the enclosure, that spins the rotor at a selected speed in order to accelerate fluid input to the enclosed rotor-based cavitational and catalytic flow-through reaction chamber through the at least one fluid-input port prior to expelling of the fluid from the reaction chamber to the at least one fluid output port.

2. The enclosed rotor-based cavitational and catalytic flow-through reaction chamber of claim 1 wherein the fluid-impermeable enclosure includes a cylindrical housing with a rectangular cross section and a rear end cap.

3. The enclosed rotor-based cavitational and catalytic flow-through reaction chamber of claim 2 wherein the rear end cap includes an annular feature, in an inner surface, to which one end of the rotor sleeve is mounted.

4. The enclosed rotor-based cavitational and catalytic flow-through reaction chamber of claim 3 wherein the rear end cap includes a fluid-input port and an internal fluid-output port in fluid communication with the fluid-input port.

5. The enclosed rotor-based cavitational and catalytic flow-through reaction chamber of claim 1 wherein the inner catalytic surface of the rotor sleeve includes a heterogeneous catalyst that is bonded to, plated onto, embedded within, or incorporated within the inner surface of the rotor sleeve.

6. The enclosed rotor-based cavitational and catalytic flow-through reaction chamber of claim 5 wherein the heterogeneous catalyst is one or more of:
- a transition metal;
- a transition-metal-containing cluster;
- a catalytic organic compound;
- a transition-metal alloy;
- one or more transition metals incorporated within a metal or ceramic substrate.

7. The enclosed rotor-based cavitational and catalytic flow-through reaction chamber of claim 1 wherein the inner catalytic surface of the rotor sleeve includes a pattern of features that, when the rotor is spun, produce cavitation and fluid-mechanical forces within a fluid enclosed within the reaction chamber.

8. The enclosed rotor-based cavitational and catalytic flow-through reaction chamber of claim 1 wherein the outer catalytic surface of the rotor includes a heterogeneous catalyst that is bonded to, plated onto, embedded within, or incorporated within the outer surface of the rotor.

9. The enclosed rotor-based cavitational and catalytic flow-through reaction chamber of claim 8 wherein the heterogeneous catalyst is one or more of:
- a transition metal;
- a transition-metal-containing cluster;
- a catalytic organic compound;
- a transition-metal alloy;
- one or more transition metals incorporated within a metal or ceramic substrate.

10. The enclosed rotor-based cavitational and catalytic flow-through reaction chamber of claim 1 wherein the outer catalytic surface of the rotor includes a pattern of features that, when the rotor is spun, produce cavitation and fluid-mechanical forces within a fluid enclosed within the reaction chamber.

11. The enclosed rotor-based cavitational and catalytic flow-through reaction chamber of claim 1 wherein the motor is an alternating-current motor controlled by a variable-speed controller interconnected to the motor through a fluid-impermeable electrical connection through the housing.

12. The enclosed rotor-based cavitational and catalytic flow-through reaction chamber of claim 1 further including a snout that encloses the motor and a spindle that transfers rotation from the motor to the rotor, the snout having a plate that includes an annular feature to which a second end of the rotor sleeve is mounted.

13. The enclosed rotor-based cavitational and catalytic flow-through reaction chamber of claim 1 included in a petroleum-refining system.

14. The enclosed rotor-based cavitational and catalytic flow-through reaction chamber of claim 1 included in a fuel-reforming system.

15. The enclosed rotor-based cavitational and catalytic flow-through reaction chamber of claim 1 included in a water purification system.

16. The enclosed rotor-based cavitational and catalytic flow-through reaction chamber of claim 1 included in a water desalination system.

17. The enclosed rotor-based cavitational and catalytic flow-through reaction chamber of claim 1 included in a heating system.

18. The enclosed rotor-based cavitational and catalytic flow-through reaction chamber of claim 1 included in a chemical reactor.

19. A method for processing a fluid, the method comprising:

inputting the fluid into an enclosed rotor-based cavitational, and catalytic flow-through reaction chamber comprising a fluid-impermeable enclosure with at least one fluid-input port and at least one fluid output port, a rotor sleeve, mounted within the enclosure, having a catalytic inner surface, a rotor mounted within the rotor sleeve to form a reaction chamber between the outer surface of the rotor and the inner surface of the rotor sleeve, the rotor having a catalytic outer surface, and a motor, mounted within the enclosure, that spins the rotor at a selected speed in order to accelerate fluid input to the enclosed rotor-based cavitational and catalytic flow-through reaction chamber through the at least one fluid-input port prior to expelling of the fluid from the reaction chamber to the at least one fluid output port; and providing electrical current to the motor to spin the rotor.

20. The method for processing a fluid of claim 19 wherein one or both of the catalytic outer rotor surface and the inner catalytic rotor-sleeve surface includes a pattern of features that, when the rotor spins, induce cavitation in the input fluid.

21. The method for processing a fluid of claim 19 further including, prior to processing the fluid:

mounting a rotor and rotor sleeve having catalytic surfaces selected to catalyze a particular chemical reaction in the input fluid; and sealing the enclosed rotor-based cavitational and catalytic flow-through reaction chamber.

* * * * *